(12) United States Patent
Narimani et al.

(10) Patent No.: US 9,083,230 B2
(45) Date of Patent: Jul. 14, 2015

(54) MULTILEVEL VOLTAGE SOURCE CONVERTERS AND SYSTEMS

(71) Applicants: Mehdi Narimani, Hamilton (CA); Bin Wu, Toronto (CA); Zhongyuan Cheng, Cambridge (CA); Navid R. Zargari, Cambridge (CA)

(72) Inventors: Mehdi Narimani, Hamilton (CA); Bin Wu, Toronto (CA); Zhongyuan Cheng, Cambridge (CA); Navid R. Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 216 days.

(21) Appl. No.: 13/922,401

(22) Filed: Jun. 20, 2013

(65) Prior Publication Data

US 2014/0376287 A1    Dec. 25, 2014

(51) Int. Cl.
```
H02M 7/537      (2006.01)
H02M 3/07       (2006.01)
H02M 7/483      (2007.01)
H02M 7/487      (2007.01)
H02M 7/49       (2007.01)
H02M 7/5395     (2006.01)
H02M 7/5387     (2007.01)
```
(52) U.S. Cl.
CPC .............. *H02M 3/07* (2013.01); *H02M 7/483* (2013.01); *H02M 7/487* (2013.01); *H02M 7/49* (2013.01); *H02M 7/5395* (2013.01); *H02M 2007/53876* (2013.01)

(58) Field of Classification Search
CPC .............. H02M 7/487; H02M 7/483; H02M 2007/4835; H02M 3/07
USPC .................................................. 363/131, 132
See application file for complete search history.

(56) References Cited

U.S. PATENT DOCUMENTS

| | | | |
|---|---|---|---|
| 4,443,841 | A | 4/1984 | Mikami et al. |
| 4,894,621 | A | 1/1990 | Koenig et al. |
| 5,298,848 | A | 3/1994 | Ueda et al. |
| 5,361,196 | A | 11/1994 | Tanamachi et al. |
| 5,502,633 | A | 3/1996 | Miyazaki et al. |

(Continued)

FOREIGN PATENT DOCUMENTS

| | | |
|---|---|---|
| CN | 1190278 | 8/1998 |
| CN | 1253999 | 5/2000 |

(Continued)

OTHER PUBLICATIONS

"Multilevel CHB Inverters", obtained from the internet at http://www4.hcmut.edu.vn/~nvnho/Download/AdPE/, Jan. 18, 2009.

(Continued)

*Primary Examiner* — Jue Zhang
(74) *Attorney, Agent, or Firm* — Fay Sharpe LLP

(57) ABSTRACT

Nested neutral point clamped (NNPC) multilevel power converter stages and systems are presented, in which the converter stage includes an NPC inverter core circuit with a flying (switched) capacitor nesting circuit, with the switches of the NPC core and the switched capacitor circuit being gated using selected redundant switching states to control the voltage of the switched capacitors to achieve a multilevel output voltage having equally spaced voltage step values. Multiple inverter stages can meet cascaded or connected in various configurations to implement single or multiphase power conversion systems, and higher output voltages can be achieved by forming to converter stages into an H-bridge configuration, and connecting multiple H-bridge stages in series with one another.

23 Claims, 26 Drawing Sheets

(56) References Cited

U.S. PATENT DOCUMENTS

| | | | |
|---|---|---|---|
| 5,625,545 | A | 4/1997 | Hammond |
| 5,638,263 | A | 6/1997 | Opal et al. |
| 5,642,275 | A | 6/1997 | Peng et al. |
| 5,790,396 | A | 8/1998 | Miyazaki et al. |
| 5,933,339 | A | 8/1999 | Duba et al. |
| 5,986,909 | A | 11/1999 | Hammond et al. |
| 6,005,788 | A | 12/1999 | Lipo et al. |
| 6,031,738 | A | 2/2000 | Lipo et al. |
| 6,058,031 | A | 5/2000 | Lyons et al. |
| 6,075,350 | A | 6/2000 | Peng |
| 6,222,284 | B1 | 4/2001 | Hammond et al. |
| 6,229,722 | B1 | 5/2001 | Ichikawa et al. |
| 6,236,580 | B1 | 5/2001 | Aiello et al. |
| 6,320,767 | B1 | 11/2001 | Shimoura et al. |
| 6,411,530 | B2 | 6/2002 | Hammond et al. |
| 6,556,461 | B1 | 4/2003 | Khersonsky et al. |
| 6,697,271 | B2 | 2/2004 | Corzine |
| 6,697,274 | B2 | 2/2004 | Bernet et al. |
| 6,795,323 | B2 | 9/2004 | Tanaka et al. |
| 6,842,354 | B1 | 1/2005 | Tallam et al. |
| 7,057,905 | B2 | 6/2006 | Macmillan |
| 7,068,526 | B2 | 6/2006 | Yamanaka |
| 7,106,025 | B1 | 9/2006 | Yin et al. |
| 7,164,254 | B2 | 1/2007 | Kerkman et al. |
| 7,170,767 | B2 | 1/2007 | Bixel |
| 7,215,559 | B2 | 5/2007 | Nondahl et al. |
| 7,428,158 | B2 | 9/2008 | Bousfield, III et al. |
| 7,568,931 | B2 | 8/2009 | Hammond |
| 7,649,281 | B2 | 1/2010 | Lai et al. |
| 7,800,254 | B2 | 9/2010 | Hammond |
| 7,830,681 | B2 | 11/2010 | Abolhassani et al. |
| 7,894,224 | B2 | 2/2011 | Ulrich |
| 7,978,488 | B2 | 7/2011 | Tanaka et al. |
| 8,008,923 | B2 | 8/2011 | Hammond |
| 8,093,764 | B2 | 1/2012 | Hammond |
| 8,107,267 | B2 | 1/2012 | Tallam et al. |
| 8,130,501 | B2 | 3/2012 | Ledezma et al. |
| 8,144,491 | B2 | 3/2012 | Bendre et al. |
| 8,159,840 | B2 | 4/2012 | Yun |
| 8,279,640 | B2 | 10/2012 | Abolhassani et al. |
| 8,400,793 | B2 | 3/2013 | Jonsson |
| 8,441,147 | B2 | 5/2013 | Hammond |
| 2004/0267468 | A1* | 12/2004 | Leuthen et al. ............. 702/64 |
| 2008/0079314 | A1 | 4/2008 | Hammond |
| 2008/0174182 | A1 | 7/2008 | Hammond |
| 2009/0073622 | A1 | 3/2009 | Hammond |
| 2010/0301975 | A1 | 12/2010 | Hammond |
| 2011/0249479 | A1 | 10/2011 | Capitaneanu et al. |
| 2012/0057380 | A1 | 3/2012 | Abe |
| 2012/0113698 | A1 | 5/2012 | Inoue |
| 2013/0044526 | A1* | 2/2013 | Soua ............................ 363/131 |
| 2013/0121042 | A1 | 5/2013 | Gan et al. |
| 2013/0148390 | A1 | 6/2013 | Na |
| 2013/0249322 | A1* | 9/2013 | Zhang et al. ................. 363/131 |
| 2013/0270917 | A1* | 10/2013 | Yatsu ............................. 307/77 |
| 2014/0063870 | A1 | 3/2014 | Bousfield, III |
| 2014/0204632 | A1 | 7/2014 | Noetzold et al. |

FOREIGN PATENT DOCUMENTS

| | | |
|---|---|---|
| CN | 1414692 | 4/2003 |
| CN | 2577503 | 10/2003 |
| CN | 190885 C | 2/2005 |
| CN | 2737060 | 10/2005 |
| CN | 1925289 | 3/2007 |
| EP | 0 874 448 | 10/1998 |
| EP | 1713168 A3 | 10/2006 |
| EP | 2698912 A2 | 2/2014 |
| GB | 1295261 A | 11/1972 |
| JP | 2006223009 A | 8/2006 |
| JP | 2013102674 A | 5/2013 |
| KR | 20080061641 A | 7/2008 |
| WO | WO 2012105737 A1 | 8/2012 |

OTHER PUBLICATIONS

Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.
Angulo, Mauricio, et al., "Level-shifted PMW for Cascaded Multilevel Inverters with Even Power Distribution", IEEE Power Electronics Specialists Conference (PESC), pp. 2373-2378, Jun. 2007.
ASI Robicon, "Perfect Harmony MV Drive Product Overview", 18 pgs.. obtained from the World Wide Web Apr. 2013.
Barbosa, Peter et al., *Active Neutral-Point-Clamped Multilevel Converters*, IEEE, 0-7803-9033-4, 2005, pp. 2296-2301.
Bruckner, Thomas, et al., *The Active NPC Converter and Its Loss-Balancing Control*, IEEE Transactions on Industrial Electronics, vol. 52, No. 3, Jun. 2005, pp. 855-868.
Cengelci, E., et al., *A New Medium Voltage PWM Inverter Topology for Adjustable Speed Drives*, IEEE, 0-7803-4943-1, 1998, pp. 1416-1423.
Chaudhuri, Toufann, et al., *Introducing the Common Cross Connected Stage ($C^3S$) for the 5L ANPC Multilevel Inverter*, IEEE, 978-1-4244-1668-4, 2008, pp. 167-173.
Cheng, Zhongyuan et al., *A Novel Switching Sequence Design for Five-Level NPC/H-Bridge Inverters with Improved Output Voltage Spectrum and Minimized Device Switching Frequency*, Power Electronics, IEEE Transactions, vol. 22, Issue 6, 2007, 6 pgs.
Etxeberria-Otadui, I., et al., *Analysis of a H-NPC topology for an AC Traction Front-End Converter*, IEEE, 978-1-4244-1742-1, 2008 13th International Power Electronics and Motion Control Conference, pp. 1555-1561.
Floricau, Dan et al., *A new stacked NPC converter: 3L-topology and control*, Proceedings of the 12th European Conf. on Power Electronics and Applications, EPE 2007, EPE Association, 2007, 10 pgs.
Glinka, M., *Prototype of Multiphase Modular-Multilevel-Converter with 2 MW power rating and 17-level- output- voltage*, IEEE, 0-7803-8399-0, 2004, pp. 2572-2576.
Guennegues, V., et al., *A Converter Topology for High Speed Motor Drive Applications*, IEEE Xplore, 2009, 8 pgs.
Guennegues, V., et al., *Selective Harmonic Elimination PWM applied to H-bridge topology in high speed applications*, POWERENG, Mar. 2009, pp. 152-156.
Hiller, Mark et al., *Medium-Voltage Drives: An overview of the common converter topologies and power semiconductor devices*, IEEE Industry Applications Magazine, Mar.-Apr. 2010, pp. 22-30.
Hossein Iman-Eini et al., "A Fault-Tolerant Control Strategy for Cascaded H-Bridge Multilevel Rectifiers", Journal of Power Electronics, vol. 1, Jan. 2010.
Hossein Sepahvand et al., "Fault Recovery Strategy for Hybrid Cascaded H-Bridge Multi-Level Inverters", 2011 IEEE, pp. 1629-1633.
Jose Rodriquez et al., "Operation of a Medium-Voltage Drive Under Faulty Conditions", IEEE Transactions on Industrial Electronics, vol. 52, No. 4, Aug. 2005, pp. 1080-1085.
Kieferndorf, F., et al., *A New Medium Voltage Drive System Based on ANCP-5L Technology*, IEEE, 978-1-4244-5697-0, 2010, pp. 643-649.
Kouro, Samir, et al., *Recent Advances and Industrial Applications of Multilevel Converters*, IEEE Transactions on Industrial Electronics, vol. 57, No. 8, Aug. 2010, pp. 2553-2580.
Lesnicar, A., et al., *A new modular voltage source inverter topology*, Inst. of Power Electronics and Control, Muenchen, DE, Oct. 10, 2007, pp. 1-10.
Li, Jun, et al., *A New Nine-Level Active NPC (ANPC) Converter for Grid Connection of Large Wind Turboines for Distributed Generation*, IEEE Transactions on Power Electronics, vol. 26, No. 3, Mar. 2011, pp. 961-972.
McGrath, Brendan Peter et al., "Multicarrier PMW Strategies for Multilevel Inverters," IEEE Transactions on Industrial Electronics, vol. 49, No. 4, pp. 858-867, Aug. 2002.
Meili, Jorg et al., *Optimized Pulse Patterns for the 5-Level ANPC Converter for High Speed High Power Applications*, IEEE, 1-4244-0136-4, 2006, pp. 2587-2592.

(56) References Cited

OTHER PUBLICATIONS

O-Harvest, product information, Beijing Leader & Harvest Electric Technologies Co., Ltd., http:/www.ld-harvest.com/en/3-1-2.htm, retrieved from the Internet Apr. 11, 2013, 3 pgs.

Pablo Lezana et al., "Survey on Fault Operation on Multilevel Inverters", IEEE Transactions on Industrial Electronics, vol. 57, No. 7, Jul. 2010, pp. 2207-2217.

Park, Young-Min, "A Simple and Reliable PWM Synchronization & Phase-Shift Method for Cascaded H-Bridge Multilevel Inverters based on a Standard Serial Communication Protocol", IEEE 41$^{st}$ IAS Annual Meeting, pp. 988-994, Oct. 2006.

Robicon Perfect Harmony, "Medium-Voltage Liquid-Cooled Drives", Siemens, Catalog D 15.1, 2012, USA Edition, obtained from the World Wide Web Apr. 2013, 91 pgs. (Downloaded to EFS Web as Part 1, pp. 1-49; and Part 2, pp. 50-91).

Robicon Perfect Harmony, "The Drive of Choice for Highest Demands", Siemens, Copyright Siemens AG 2008, 16 pgs, .obtained from the World Wide Web Apr. 2013.

Saeedifard, Maryann et al., *Analysis and Control of DC-Capacitor-Voltage-Drift Phenomenon of a Passive Front-End Five-Level Converter*, IEEE Transactions on Industrial Electronics, vol. 54, No. 6, Dec. 2007, pp. 3255-3266.

Sanmin Wei et al., "Control Method for Cascaded H-Bridge Multilevel Inverter with Faulty Power Cells", 2003 IEEE, pp. 261-267.

Sedghi, S. et al., "A New Multilevel Carrier Based Pulse Width Modulation Method for Modular Multilevel Inverter", IEEE, 8$^{th}$ International Conference on Power Electronics—ECCE Asia (ICPE & ECCE), pp. 1432-1439, May 30-Jun. 3, 2011.

Serpa, L.A. et al., *Five-Level Virtual-Flux Direct Power Control for the Active Neutral-Point Clamped Multilevel Inverter*, IEEE, 978-1-4244-1668-4, 2008, pp. 1668-1674.

Silva, Cesar et al., *Control of an Hybrid Multilevel Inverter for Current Waveform Improvement*, IEEE, 978-1-4244-1666-0, 2008, pp. 2329-2335.

Surin Khomfoi et al., "Fault Detection and Reconfiguration Technique for Cascaded H-bridge 11-level Inverter Drives Operating under Faulty Condition", 2007 IEEE, PEDS 2007, pp. 1035-1042.

Ulrich, James A., et al., *Floating Capacitor Voltage Regulation in Diode Clamped Hybrid Multilevel Converters*, IEEE, 978-1-4244-3439-8, 2009, pp. 197-202.

Wen, Jun et al., *Synthesis of Multilevel Converters Based on Single- and/or Three-Phase Converter Building Blocks*, IEEE Transactions on Power Electronics, vol. 23, No. 3, May 2008, pp. 1247-1256.

Wenchao Song et al., "Control Strategy for Fault-Tolerant Cascaded Multilevel Converter based STATCOM", 2007 IEEE, pp. 1073-1076.

Wu, Bin, "EE8407 Power Converter Systems", Topic 6, Multilevel Cascaded H-Bridge (CHB) Inverters, pp. 1-14, 2006.

Wu, Bin, "High-Power Converters and AC Drives", Wiley-IEEE Press, 2006, Chapter 7, pp. 119-142.

Wu, C.M., et al., *A Five-Level Neutral-Point-Clamped H-Bridge PWM Inverter with Superior Harmonics Suppression: A Theoretical Analysis*, IEEE, 0-7803-5471-0, 1999 V-198-V-201.

Yantra Harvest Energy Pvt. Ltd., "Medium Voltage Drives", www.yantraharvest.com, obtained from the World Wide Web Apr. 2013.

Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.

Wu, High-Power Converters and AC Drives. New York/Piscataway, NJ: Wiley/IEEE Press, 2006, Ch. 1.

Rendusara, et al., "Analysis of common mode voltage-'neutral shift' in medium voltage PWM adjustable speed drive (MV-ASD) systems", IEEE Trans. Power Electron., vol. 15, No. 6, pp. 1124-1133, Nov. 2000.

Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.

Naik et al., "Circuit model for shaft voltage prediction in induction motors fed by PWMbased AC drives", IEEE Trans. Ind. Appl., vol. 39, No. 5, pp. 1294-1299, Nov./Dec. 1996.

Akagi et al., "A Passive EMI Filter for Eliminating Both Bearing Current and Ground Leakage Current From an Inverter-Driven Motor", IEEE Transactions on Power Electronics, 2006, pp. 1459-1469.

Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012, pp. 1152-1158.

Akagi et al., "An Approach to Eliminating High-Frequency Shaft Voltage and Ground Leakage Current From an Inverter-Driven Motor", IEEE Transactions on Industry Applications, 2004, pp. 1162-1169.

Zhu et al., An Integrated AC Choke Design for Common-Mode Current Suppression in Neutral-Connected Power Converter Systems. IEEE Transactions on Power Electronics, 2012, pp. 1228-1236.

Cavalcanti et al., "Modulation Techniques to Eliminate Leakage Currents in Transformerless Three-Phase Photovoltaic Systems", IEEE Transactions on Industrial Electronics, 2010, pp. 1360-1368.

Horvath, "How isolation transformers in MV drives protect motor insulation", TM GE Automation Systems, Roanoke, VA, 2004.

Lai et al., "Optimal common-mode voltage reduction PWM technique for inverter control with consideration of the dead-time effects—part I: basic development," IEEE Trans. Ind. Appl., vol. 40, No. 6, pp. 1605-1612, Nov./Dec. 2004.

Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.

Hava et al., "A high-performance PWM algorithm for common-mode voltage reduction in three-phase voltage source inverters," IEEE Trans. Power Electron., vol. 26, No. 7, pp. 1998-2008, Jul. 2011.

Cacciato et al., "Reduction of common mode currents in PWM inverter motor drives", IEEE Trans. Ind. Appl., vol. 35, No. 2, pp. 469 â € 476, Mar./Apr. 1999.

Cacciato et al., "Modified space-vector-modulation technique for common mode currents reduction and full utilization of the DC bus", in Proc. IEEE APEC Conf. Rec., 2009, pp. 109-115.

Kouro et al., "Recent advances and industrial applications of multilevel converters," IEEE Trans. Ind. Electron., vol. 57, No. 8, pp. 2553-2580, Aug. 2010.

Wu, "High-Power Converters and AC Drives", Piscataway, NJ: IEEE Press, 2006, Chapter 9.

Rodriguez et al., "Multilevel inverters: A survey of topologies, controls, and applications," IEEE Trans. Ind. Electron., vol. 49, No. 4, pp. 724-738, Aug. 2002.

Rodriguez, et al., "Multilevel voltage source- converter topologies for industrial medium-voltage drives," IEEE Trans. Ind. Electron., vol. 54, No. 6, pp. 2930-2945, Dec. 2007.

Saeedifard, et al., "Operation and control of a hybrid seven-level converter," IEEE Trans. Power Electron., vol. 27, No. 2, pp. 652-660, Feb. 2012.

Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.

Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.

Guennegues et al., "Selective harmonic elimination PWM applied to H-bridge topology in high speed applications," in Proc. Int. Conf. POWERENG, Mar. 18-20, 2009, pp. 152-156.

Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.

Bruckner et al., "The active NPC converter and its loss-balancing control," IEEE Trans. Ind. Electron., vol. 52, No. 3, pp. 855-868, Jun. 2005.

Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.

(56) References Cited

OTHER PUBLICATIONS

Meili et al., "Optimized pulse patterns for the 5-level ANPC converter for high speed high power applications," in Proc. 32nd IEEE IECON, Nov. 6-10, 2006, pp. 2587-2592.

Serpa et al., "Fivelevel virtual-flux direct power control for the active neutral-point clamped multilevel inverter," in Proc. IEEE Power Electron. Spec. Conf.

Kieferndorf et al., "A new medium voltage drive system based on anpc-5I technology," in Proc. IEEE-ICIT, Viña del Mar, Chile, Mar. 2010, pp. 605-611.

Barbosa et al., "Active neutral-point-clamped multilevel converters," in Proc. IEEE 36th Power Electron. Spec. Conf., Jun. 16, 2005, pp. 2296-2301.

Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.

Rodriguez et al., "A New Modulation Method to Reduce Common-Mode Voltages in Multilevel Inverters", IEEE Transactions on Industrial Electronics, vol. 51, No. 4, Aug. 2004, 834-939.

Lesnicar et al., "An Innovative Modular Multilevel Converter Topology Suitable for a Wide Power Range", 2003 IEEE Bologna PowerTech Conference, Jun. 23-26, Bologna Italy, 6 pgs.

Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.

European Search Report, EP Application No. 14167709.6-1809/2816719, Mailed Mar. 3, 2015, Completed Feb. 20, 2015, The Hague, 8 pgs.

* cited by examiner

| | SA1 | SA2 | SA3 | SA4 | SA5 | SA6 | SB1 | SB2 | SB3 | SB4 | SB5 | SB6 | $V_{CA1}$ | $V_{CA2}$ | $V_{CB1}$ | $V_{CB2}$ | $V_N$ | $V_A$ | $V_{AN}$ |
|---|---|---|---|---|---|---|---|---|---|---|---|---|---|---|---|---|---|---|---|
| V1 | 0 | 0 | 0 | 1 | 1 | 1 | 1 | 1 | 1 | 0 | 0 | 0 | N/A | N/A | N/A | N/A | $-V_{DC}/2$ | $V_{DC}/2$ | $V_{DC}$ |
| V2 | 1 | 0 | 0 | 1 | 1 | 0 | 1 | 1 | 1 | 0 | 0 | 0 | C$I_{OUT}$>0 D$I_{OUT}$<0 | C$I_{OUT}$>0 D$I_{OUT}$<0 | N/A | N/A | $-V_{DC}/6$ | $V_{DC}/2$ | $2V_{DC}/3$ |
| V3 | 0 | 0 | 1 | 1 | 0 | 1 | 1 | 1 | 1 | 0 | 0 | 0 | N/A | D$I_{OUT}$>0 C$I_{OUT}$<0 | N/A | N/A | $-V_{DC}/6$ | $V_{DC}/2$ | $2V_{DC}/3$ |
| V4 | 0 | 0 | 0 | 1 | 1 | 1 | 1 | 0 | 1 | 1 | 0 | 0 | N/A | N/A | C$I_{OUT}$>0 D$I_{OUT}$<0 | N/A | $-V_{DC}/2$ | $V_{DC}/6$ | $2V_{DC}/3$ |
| V5 | 0 | 0 | 0 | 1 | 1 | 1 | 0 | 1 | 1 | 0 | 0 | 0 | N/A | N/A | D$I_{OUT}$>0 C$I_{OUT}$<0 | D$I_{OUT}$>0 C$I_{OUT}$<0 | $-V_{DC}/2$ | $V_{DC}/6$ | $2V_{DC}/3$ |
| V6 | 1 | 0 | 1 | 1 | 0 | 0 | 1 | 1 | 1 | 0 | 0 | 0 | C$I_{OUT}$>0 D$I_{OUT}$<0 | N/A | N/A | N/A | $V_{DC}/6$ | $V_{DC}/2$ | $V_{DC}/3$ |
| V7 | 0 | 1 | 1 | 0 | 0 | 0 | 1 | 0 | 1 | 0 | 0 | 0 | D$I_{OUT}$>0 C$I_{OUT}$<0 | D$I_{OUT}$>0 C$I_{OUT}$<0 | N/A | N/A | $V_{DC}/6$ | $V_{DC}/2$ | $V_{DC}/3$ |
| V8 | 1 | 0 | 0 | 1 | 1 | 0 | 1 | 0 | 1 | 1 | 0 | 0 | C$I_{OUT}$>0 D$I_{OUT}$<0 | C$I_{OUT}$>0 D$I_{OUT}$<0 | C$I_{OUT}$>0 D$I_{OUT}$<0 | N/A | $-V_{DC}/6$ | $V_{DC}/6$ | $V_{DC}/3$ |
| V9 | 0 | 0 | 1 | 1 | 0 | 1 | 1 | 0 | 1 | 1 | 0 | 0 | N/A | D$I_{OUT}$>0 C$I_{OUT}$<0 | C$I_{OUT}$>0 D$I_{OUT}$<0 | N/A | $-V_{DC}/6$ | $V_{DC}/6$ | $V_{DC}/3$ |

FIG. 10A

| | SA1 | SA2 | SA3 | SA4 | SA5 | SA6 | SB1 | SB2 | SB3 | SB4 | SB5 | SB6 | $V_{CA1}$ | $V_{CA2}$ | $V_{CB1}$ | $V_{CB2}$ | $V_N$ | $V_A$ | $V_{AN}$ |
|---|---|---|---|---|---|---|---|---|---|---|---|---|---|---|---|---|---|---|---|
| V10 | 1 | 0 | 0 | 1 | 1 | 0 | 0 | 1 | 1 | 0 | 0 | 0 | $CI_{OUT}>0$ $DI_{OUT}<0$ | $CI_{OUT}>0$ $DI_{OUT}<0$ | $DI_{OUT}>0$ $CI_{OUT}<0$ | $DI_{OUT}>0$ $CI_{OUT}<0$ | $-V_{DC}/6$ | $V_{DC}/6$ | $V_{DC}/3$ |
| V11 | 0 | 0 | 1 | 1 | 0 | 1 | 0 | 1 | 1 | 0 | 0 | 0 | N/A | $DI_{OUT}>0$ $CI_{OUT}<0$ | $DI_{OUT}>0$ $CI_{OUT}<0$ | $DI_{OUT}>0$ $CI_{OUT}<0$ | $-V_{DC}/6$ | $V_{DC}/6$ | $V_{DC}/3$ |
| V12 | 0 | 0 | 0 | 1 | 1 | 1 | 1 | 0 | 0 | 1 | 1 | 0 | N/A | $DI_{OUT}>0$ $CI_{OUT}<0$ | N/A | N/A | $-V_{DC}/2$ | $-V_{DC}/6$ | $V_{DC}/3$ |
| V13 | 0 | 0 | 0 | 1 | 1 | 1 | 0 | 0 | 1 | 1 | 1 | 1 | N/A | N/A | N/A | $DI_{OUT}>0$ $CI_{OUT}<0$ | $-V_{DC}/2$ | $-V_{DC}/6$ | $V_{DC}/3$ |
| V14 | 1 | 1 | 1 | 0 | 0 | 0 | 1 | 1 | 1 | 0 | 0 | 0 | N/A | N/A | N/A | N/A | $V_{DC}/2$ | $V_{DC}/2$ | 0 |
| V15 | 1 | 0 | 0 | 1 | 1 | 0 | 1 | 0 | 0 | 1 | 1 | 0 | $CI_{OUT}>0$ $DI_{OUT}<0$ | $CI_{OUT}>0$ $DI_{OUT}<0$ | $CI_{OUT}>0$ $DI_{OUT}<0$ | $CI_{OUT}>0$ $DI_{OUT}<0$ | $-V_{DC}/6$ | $-V_{DC}/6$ | 0 |
| V16 | 0 | 0 | 1 | 1 | 0 | 1 | 1 | 0 | 0 | 1 | 1 | 0 | N/A | $CI_{OUT}>0$ $DI_{OUT}<0$ | $CI_{OUT}>0$ $DI_{OUT}<0$ | $CI_{OUT}>0$ $DI_{OUT}<0$ | $-V_{DC}/6$ | $-V_{DC}/6$ | 0 |
| V17 | 1 | 0 | 1 | 1 | 0 | 0 | 1 | 0 | 1 | 1 | 0 | 0 | $CI_{OUT}>0$ $DI_{OUT}<0$ | N/A | $CI_{OUT}>0$ $DI_{OUT}<0$ | N/A | $V_{DC}/6$ | $V_{DC}/6$ | 0 |
| V18 | 0 | 1 | 1 | 0 | 0 | 0 | 1 | 0 | 1 | 1 | 0 | 0 | $DI_{OUT}>0$ $CI_{OUT}<0$ | $DI_{OUT}>0$ $CI_{OUT}<0$ | $CI_{OUT}>0$ $DI_{OUT}<0$ | N/A | $V_{DC}/6$ | $V_{DC}/6$ | 0 |

FIG. 10B

| | SA1 | SA2 | SA3 | SA4 | SA5 | SA6 | SB1 | SB2 | SB3 | SB4 | SB5 | SB6 | $V_{CA1}$ | $V_{CA2}$ | $V_{CB1}$ | $V_{CB2}$ | $V_N$ | $V_A$ | $V_{AN}$ |
|---|---|---|---|---|---|---|---|---|---|---|---|---|---|---|---|---|---|---|---|
| V19 | 1 | 0 | 1 | 1 | 0 | 0 | 0 | 1 | 1 | 0 | 0 | 0 | $CI_{OUT}>0$ $DI_{OUT}<0$ | N/A | $DI_{OUT}>0$ $CI_{OUT}<0$ | $DI_{OUT}>0$ $CI_{OUT}<0$ | $V_{DC}/6$ | $V_{DC}/6$ | 0 |
| V20 | 0 | 1 | 1 | 0 | 0 | 0 | 0 | 1 | 1 | 0 | 0 | 0 | $DI_{OUT}>0$ $CI_{OUT}<0$ | $DI_{OUT}>0$ $CI_{OUT}<0$ | $DI_{OUT}>0$ $CI_{OUT}<0$ | $DI_{OUT}>0$ $CI_{OUT}<0$ | $V_{DC}/6$ | $V_{DC}/6$ | 0 |
| V21 | 1 | 0 | 0 | 1 | 1 | 0 | 0 | 0 | 1 | 1 | 0 | 1 | $CI_{OUT}>0$ $DI_{OUT}<0$ | $CI_{OUT}>0$ $DI_{OUT}<0$ | N/A | $DI_{OUT}>0$ $CI_{OUT}<0$ | $-V_{DC}/6$ | $-V_{DC}/6$ | 0 |
| V22 | 0 | 0 | 1 | 1 | 0 | 1 | 0 | 0 | 1 | 1 | 0 | 1 | N/A | $DI_{OUT}>0$ $CI_{OUT}<0$ | N/A | $DI_{OUT}>0$ $CI_{OUT}<0$ | $-V_{DC}/6$ | $-V_{DC}/6$ | 0 |
| V23 | 0 | 0 | 0 | 1 | 1 | 1 | 0 | 0 | 0 | 1 | 1 | 1 | N/A | N/A | $DI_{OUT}>0$ $CI_{OUT}<0$ | N/A | $-V_{DC}/2$ | $-V_{DC}/2$ | 0 |
| V24 | 1 | 1 | 1 | 0 | 0 | 0 | 1 | 1 | 1 | 0 | 0 | 0 | N/A | N/A | $CI_{OUT}>0$ $DI_{OUT}<0$ | $DI_{OUT}>0$ $CI_{OUT}<0$ | $V_{DC}/2$ | $V_{DC}/6$ | $-V_{DC}/3$ |
| V25 | 1 | 0 | 1 | 1 | 0 | 0 | 1 | 0 | 0 | 1 | 0 | 0 | $CI_{OUT}>0$ $DI_{OUT}<0$ | $DI_{OUT}>0$ $CI_{OUT}<0$ | $CI_{OUT}>0$ $DI_{OUT}<0$ | $CI_{OUT}>0$ $DI_{OUT}<0$ | $V_{DC}/2$ | $-V_{DC}/6$ | $-V_{DC}/3$ |
| V26 | 0 | 1 | 1 | 0 | 0 | 0 | 1 | 0 | 0 | 1 | 0 | 0 | $DI_{OUT}>0$ $CI_{OUT}<0$ | $CI_{OUT}>0$ $DI_{OUT}<0$ | $CI_{OUT}>0$ $DI_{OUT}<0$ | $DI_{OUT}>0$ $CI_{OUT}<0$ | $V_{DC}/6$ | $-V_{DC}/6$ | $-V_{DC}/3$ |
| V27 | 1 | 0 | 1 | 1 | 0 | 0 | 0 | 0 | 1 | 1 | 0 | 1 | $CI_{OUT}>0$ $DI_{OUT}<0$ | N/A | N/A | $DI_{OUT}>0$ $CI_{OUT}<0$ | $V_{DC}/6$ | | |

FIG. 10C

| | SA1 | SA2 | SA3 | SA4 | SA5 | SA6 | SB1 | SB2 | SB3 | SB4 | SB5 | SB6 | $V_{CA1}$ | $V_{CA2}$ | $V_{CB1}$ | $V_{CB2}$ | $V_N$ | $V_A$ | $V_{AN}$ |
|---|---|---|---|---|---|---|---|---|---|---|---|---|---|---|---|---|---|---|---|
| V28 | 0 | 1 | 1 | 0 | 0 | 0 | 0 | 0 | 1 | 1 | 0 | 1 | $DI_{OUT}>0$ $CI_{OUT}<0$ | $DI_{OUT}>0$ $CI_{OUT}<0$ | N/A | $DI_{OUT}>0$ $CI_{OUT}<0$ | $V_{DC}/6$ | $-V_{DC}/6$ | $-V_{DC}/3$ |
| V29 | 1 | 1 | 1 | 0 | 0 | 0 | 1 | 0 | 1 | 1 | 0 | 0 | N/A | N/A | $CI_{OUT}>0$ $DI_{OUT}<0$ | N/A | $V_{DC}/2$ | $V_{DC}/6$ | $-V_{DC}/3$ |
| V30 | 1 | 0 | 0 | 1 | 1 | 0 | 0 | 0 | 0 | 1 | 1 | 1 | $CI_{OUT}>0$ $DI_{OUT}<0$ | $CI_{OUT}>0$ $DI_{OUT}<0$ | N/A | N/A | $-V_{DC}/6$ | $-V_{DC}/2$ | $-V_{DC}/3$ |
| V31 | 0 | 0 | 1 | 1 | 0 | 1 | 0 | 0 | 0 | 1 | 1 | 1 | N/A | $DI_{OUT}>0$ $CI_{OUT}<0$ | N/A | N/A | $-V_{DC}/6$ | $-V_{DC}/2$ | $-V_{DC}/3$ |
| V32 | 1 | 0 | 1 | 1 | 0 | 0 | 0 | 0 | 0 | 1 | 1 | 1 | $CI_{OUT}>0$ $DI_{OUT}<0$ | N/A | N/A | N/A | $V_{DC}/6$ | $-V_{DC}/2$ | $-2V_{DC}/3$ |
| V33 | 0 | 1 | 1 | 0 | 0 | 0 | 0 | 0 | 0 | 1 | 1 | 1 | $DI_{OUT}>0$ $CI_{OUT}<0$ | $CI_{OUT}>0$ $DI_{OUT}<0$ | N/A | N/A | $V_{DC}/6$ | $-V_{DC}/2$ | $-2V_{DC}/3$ |
| V34 | 1 | 1 | 1 | 0 | 0 | 0 | 0 | 0 | 1 | 1 | 0 | 1 | N/A | N/A | N/A | $DI_{OUT}>0$ $CI_{OUT}<0$ | $V_{DC}/2$ | $-V_{DC}/6$ | $-2V_{DC}/3$ |
| V35 | 1 | 1 | 1 | 0 | 0 | 0 | 1 | 0 | 0 | 1 | 1 | 0 | N/A | N/A | $CI_{OUT}>0$ $DI_{OUT}<0$ | $CI_{OUT}>0$ $DI_{OUT}<0$ | $V_{DC}/2$ | $-V_{DC}/6$ | $-2V_{DC}/3$ |
| V36 | 1 | 1 | 1 | 0 | 0 | 0 | 0 | 0 | 0 | 1 | 1 | 1 | N/A | N/A | N/A | N/A | $V_{DC}/2$ | $-V_{DC}/2$ | $-V_{DC}$ |

FIG. 10D

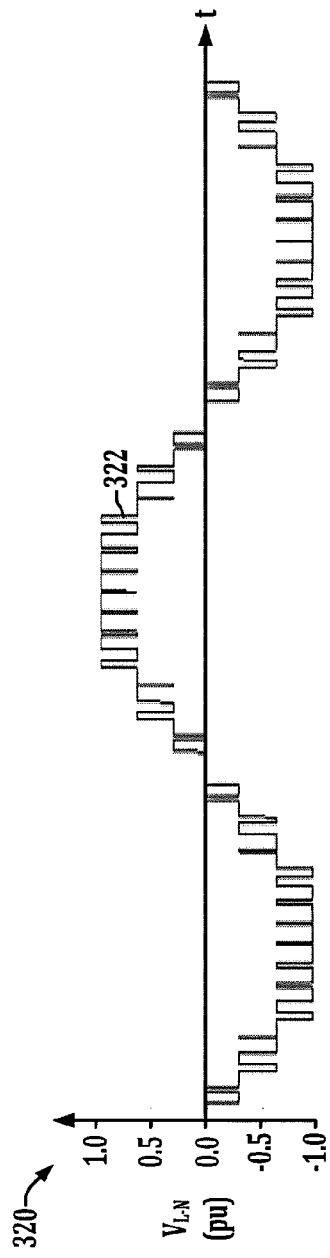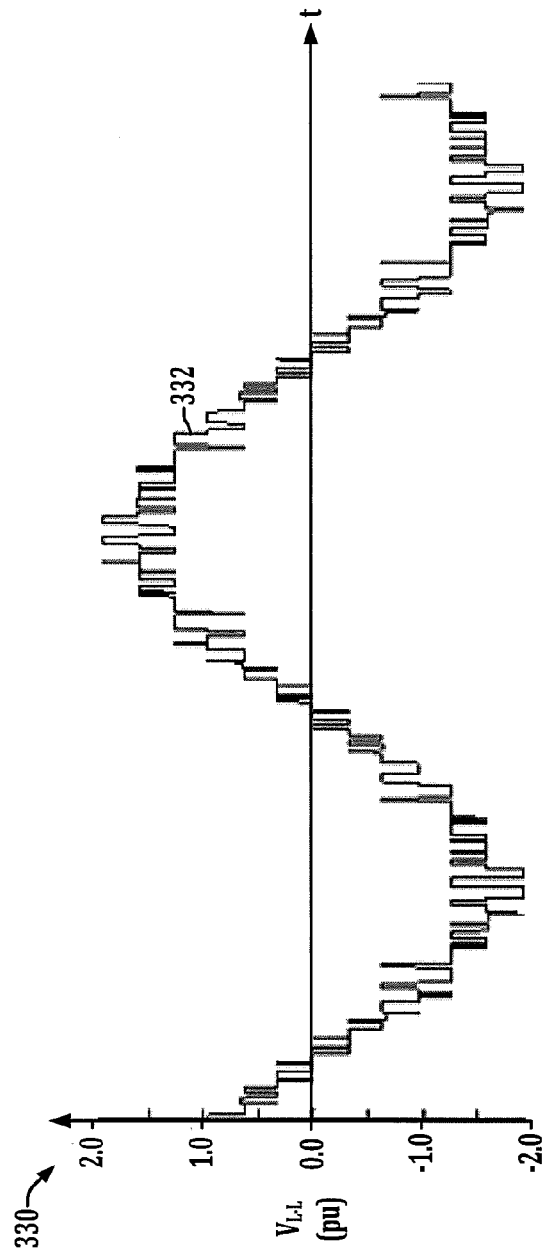
FIG. 11
FIG. 12

US 9,083,230 B2

MULTILEVEL VOLTAGE SOURCE CONVERTERS AND SYSTEMS

BACKGROUND

Power converters are used to convert input electrical energy from one form to another for driving a load. One form of power conversion system is a motor drive, which may be employed for variable speed operation of an electric motor load. For applications requiring fairly large output voltages, so-called multilevel voltage source converter architectures have been developed, including flying capacitor designs, neutral point clamped (NPC) designs, as well as cascaded and hybrid typologies. NPC designs include a pair of capacitors connected across a DC input providing a neutral node, with each capacitor being charged to half the DC input value. A series of switches are connected across the DC bus, with a pair of diodes connecting intermediate switch nodes to the neutral point. The NPC converter advantageously provides a relatively simple circuit structure, but increasing the number of output levels in an NPC converter increases switching and diode conduction losses and leads to increased reverse recovery current flow. Moreover, high output level NPC converters suffer from uneven distribution of switching device losses thereby limiting the maximum power rating, output current and switching frequency for a given switch type. In addition, the number of clamping diodes increases substantially as the number of output levels increases. Flying capacitor designs utilize one or more capacitors that are selectively interconnected to provide the output voltage. This type of multilevel converter, however, suffers from the need for high switching frequencies to keep the capacitors properly balanced, and the voltages on the flying capacitors must be initialized. Cascaded H-bridge (CHB) topologies may be used to achieve significantly high output voltage levels and high output power ratings, while allowing the use of relatively low switching frequencies and low voltage components. However, CHB designs require a significantly higher number of components to achieve regenerative operation, and a CHB converter typically requires a phase-shifting transformer, leading to higher cost. Moreover, the CHB approach requires a large number of isolated DC sources. Accordingly, a need remains for improved multilevel power converters and system designs capable of providing multilevel inverter output capability for driving the load at variable speeds and torques.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

The present disclosure provides multilevel power converter stages as well as power conversion systems employing two or more such multilevel converters connected in a variety of configurations. The multilevel power converter includes an NPC type inverter circuit nested in a switched capacitor circuit to form a nested NPC (NNPC) power converter, with a controller that operates the switches of the inverter and switched capacitor circuit to provide a multilevel output voltage. The controller in certain embodiments employs selective choice of redundant switching states to control the charging and discharging of the switched capacitors to achieve a predetermined target capacitor voltage value. In certain implementations, the switching control and capacitor voltage regulation advantageously ensure switched capacitor voltages of less than half the DC input voltage value, and facilitate provision of the converter output voltage at one of multiple distinct levels of substantially equally spaced steps, thereby balancing the voltage seen by the individual switching devices.

In certain embodiments, the inverter circuit includes two or more inverter switches connected in series between inverter circuit input nodes, with an inverter output node connecting two of the inverter switching devices. The inverter further includes a clamping circuit with first and second clamping elements, such as clamping switches or diodes, connected in series between first and second internal nodes of the inverter switching circuit, with a third internal node joining the first and second clamping elements. The switched capacitor circuit in certain implementations includes two or more switches individually connected between one of the inverter circuit input nodes and a corresponding DC input, as well as first and second capacitors individually connected between a corresponding one of the inverter circuit input nodes and the third internal node. The controller provides switching control signals to the inverter switches and to the switched capacitor circuit switching devices to provide multilevel output at the inverter output node and to control charging and discharging of the first and second capacitors. Various implementations are possible, such as four or more distinct line-to-neutral output voltage levels. Certain implementations provide cascaded switched capacitor circuitry, including multiple sets of two flying capacitors and associated switching devices for higher numbers of possible output levels.

In accordance with further aspects of the disclosure, power conversion systems are provided, which include two or more of the nested NPC converter stages or modules. In certain embodiments, the DC inputs of two NNPC modules are connected together, with the inverter output of the first converter stage connected to a system neutral node, and the inverter output of the second stage providing an AC output for the system. In this manner, an NNPC H-bridge configuration can be achieved, and two or more such configurations can be cascaded or connected in series to achieve a variety of output power levels and output voltages. In addition, the power conversion systems can be constructed using multiple sets of such modules or groups thereof to provide the multiphase outputs for driving a load. In these multi-stage systems, moreover, the switching control can be provided to select from various redundant overall switching states in order to achieve control over the charging and discharging of the individual switched capacitors, and may facilitate balancing of voltages seen by individual switching devices and advantageously provide output voltages at any suitable number of distinct levels of substantially equally spaced steps.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIGS. 10A-10D illustrate a switching state table to provide switching control signals to the NNPC H-bridge power conversion system of FIG. 9 to generate a multilevel output voltage and to control charging and discharging of the flying capacitors of each NNPC power converter stage;

FIG. 11 is a graph illustrating an exemplary seven-level line-to-neutral voltage output waveform for the NNPC H-bridge power conversion system of FIG. 9;

FIG. 12 is a graph illustrating an exemplary 13-level line-to-line voltage output waveform for the NNPC H-bridge power conversion system of FIG. 9;

DETAILED DESCRIPTION

Figure 1:
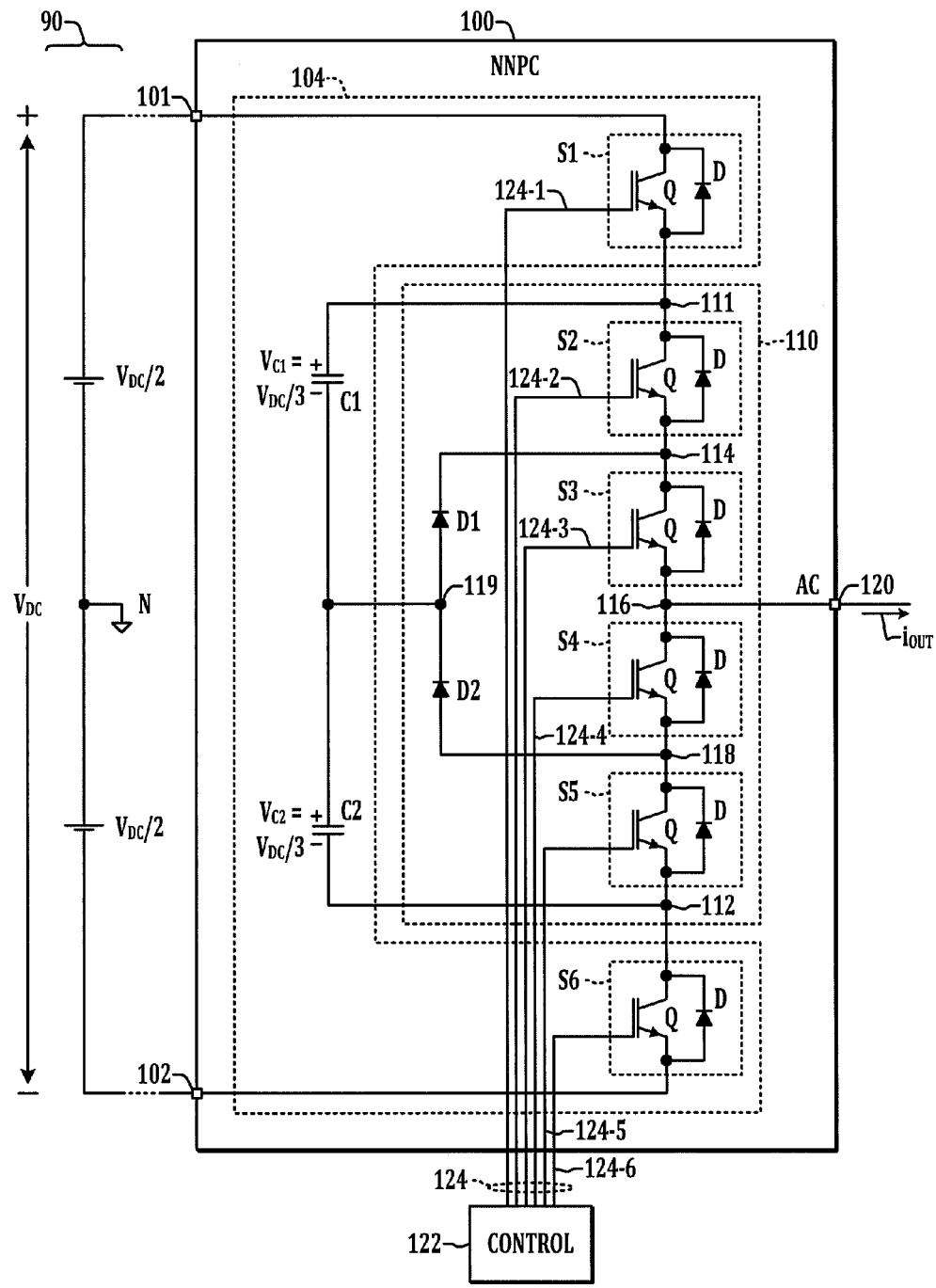
FIG. 1 is a schematic diagram illustrating an exemplary nested neutral point clamped (NNPC) multilevel power converter including an inverter circuit and a switched capacitor circuit with a controller using redundant switch state selection to control charging and discharging of first and second flying capacitors to provide multilevel output voltage and to regulate the flying capacitors to one third of the DC input voltage level in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale. Power converter stages 100 are illustrated and described below, as well as power conversion systems formed by various interconnections of the illustrated converter stages 100, wherein the described nested NPC (NNPC) power converters 100 may be used to form single or multiphase power supplies for driving any type of load, and the described power converters and power conversion systems may be employed in motor drives, although various concepts of the present disclosure are not limited to any specific applications.

Figure 18:
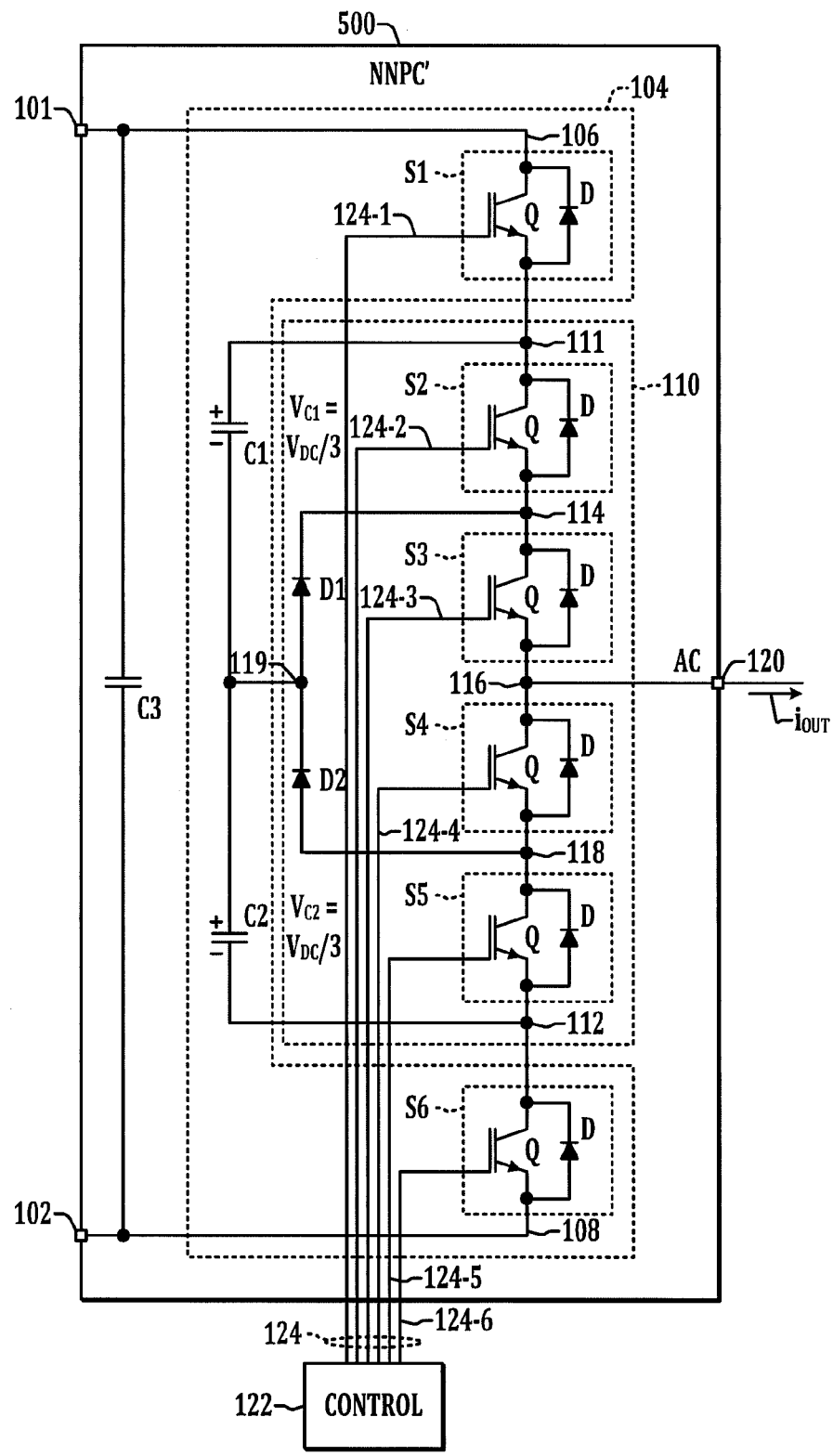
FIG. 18 is a schematic diagram illustrating another embodiment of an NNPC power converter stage having an integral capacitor connected between the DC input terminals.

FIG. 1 illustrates an exemplary multilevel power converter 100, with first and second DC inputs 101 and 102, respectively, and an AC output 120 providing a single-phase AC output voltage and associated output current $i_{OUT}$ to drive a load (not shown). The illustrated power converter 100 is referred to herein as a nested neutral point clamped (NNPC) power converter, and includes a switched capacitor (e.g., flying capacitor) circuit 104 nesting an NPC type inverter circuit 110. Although referred to herein as an NNPC power converter, the center node 119 of the NPC type inverter circuit 110 need not be connected to any system "neutral". The power converter 100 is provided with input DC electrical power from a DC source 90 via the terminals 101 and 102, where FIG. 1 illustrates an exemplary input configuration including two series-connected batteries, each having a voltage value of $V_{DC}/2$ with the power converter 100 thus being provided with a DC input voltage having a value $V_{DC}$. In addition, although not a strict requirement of all implementations of the power converter 100, the configuration shown in FIG. 1 includes a neutral node "N" connected to the connection point of the two batteries of the DC input source 90. Any suitable DC source 90 can be used in connection with the power converter 100, including without limitation one or more batteries, active and/or passive rectifiers, etc. Moreover, the DC source 90 may include DC bus capacitances, whether a single capacitor or any combination of multiple capacitors connected in any series and/or parallel configuration. In addition, as shown below in connection with FIG. 18, certain embodiments of the NNPC converter stage 100 may include an on-board capacitance connected between the DC input terminals 101 and 102.

As illustrated in FIG. 1, the inverter circuit 110 includes switching devices S2-S5 connected in series with one another between first and second inverter circuit input nodes 111 and 112, as well as an inverter output node 116 connecting two of the inverter switching devices S3 and S4, where the inverter output node 116 is connected directly or indirectly to the AC output terminal 120 of the converter 100. The inverter circuit 110, moreover, can include any integer number of switching devices S connected in series with one another between the nodes 111 and 112. In the illustrated example, four devices S2-S5 are provided, with the output node 116 having two switching devices S2 and S3 between the output 116 and the upper input node 111, and two switches S4 and S5 connected between the output node 116 and the second inverter input node 112. In addition, the switched capacitor circuit 104 includes additional switches S1 and S6 connected as shown between the inverter inputs 111 and 112 and the corresponding DC input terminals 101 and 102. Any suitable type of switching devices S1-S6 may be used in the circuits 104 and 110 of the power stage 100, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc. Moreover, as illustrated in FIG. 1, the individual switches S1-S6 include diodes for conducting current in reverse directions when the switch is off. The inverter circuit 110 of the NNPC converter 100 also includes a clamping circuit including first and second clamping elements, such as diodes D1 and D2 connected in series with one another, with the cathode of D1 connected to a first internal node 114, and the anode of D2 connected to a second internal node 118.

The cathode of D2 is joined to the anode of D1 at a third internal node 119. In this configuration, D1 provides a conductive path from the third internal node 119 to the first internal node 114, and D2 provides a conductive path from the second internal node 118 to the third internal node 119. Active clamping switches or other clamping elements can be used in other embodiments instead of clamping diodes as shown in the drawings. Other configurations are possible in which diodes or other clamping elements are connected in series with one another between first and second internal nodes of the inverter switching circuit. Further, single diodes D1 and D2 may be used as shown, or multiple diodes or other clamping elements may be used. For example, D1 can be replaced with two or more diodes in any suitable series and/or parallel configuration between the nodes 119 and 114, and D2 may be replaced with two or more diodes interconnected in any suitable fashion between the nodes 118 and 119. Furthermore, the diodes D1 and D2 and/or the clamping diodes across the switching devices S1-S6 of the NNPC converters 100 can alternatively be clamping switches (not shown). The clamping diodes D1 and D2 can also be replaced by active switches to achieve active neutral point clamping.

The switched capacitor circuit 104 includes switches S1 and S6 connected between the prospective DC input terminals 101 and 102 and a corresponding one of the inverter circuit input nodes 111 and 112. In addition, the switched capacitor circuit 104 includes first and second capacitors C1 and C2 individually connected between the third internal node 119 and the corresponding inverter circuit input nodes 111 and 112 as shown. Any suitable type and configuration of capacitors C1 and C2 can be used, where the individual capacitors C1 and C2 can be a single capacitor or multiple capacitors connected in any suitable series and/or parallel configuration to provide a first capacitance C1 between the nodes 111 and 119 as well as a second capacitance C2 between the nodes 119 and 112. Moreover, C1 and C2 are preferably of substantially equal capacitance values, although not a strict requirement of the present disclosure.

Referring also to FIGS. 2-5, a controller 122 provides switching control signals 124-2, 124-3, 124-4 and 124-5 to the respective inverter switching devices S2-S5 and provides switching control signals 124-1 and 124-6 to the switched capacitor circuit switching devices S1 and S6. If the clamping devices D1 and D2 are active devices, controller 122 also provides switching control signals to active clamping devices D1 and D2. Controller 122 also accepts feedback signals such as voltages and/or currents which are not shown in the figures. The controller 122 can be implemented as part of the converter 100 and/or may be a separate component or system, and a single controller 122 may provide signals 124 to multiple converter stages 100. The converter controller 122 can be implemented using any suitable hardware, processor executed software or firmware, or combinations thereof, wherein an exemplary embodiment of the controller 122 includes one or more processing elements such as microprocessors, microcontrollers, FPGAs, DSPs, programmable logic, etc., along with electronic memory, program memory and signal conditioning driver circuitry, with the processing element(s) programmed or otherwise configured to generate the inverter switching control signals 124 suitable for operating the switching devices of the power stages 100, as well as to perform other motor drive operational tasks to drive a load. Moreover, computer readable mediums are contemplated with computer executable instructions for implementing the described power converter switching control processes and techniques, which may be stored as program instructions in an electronic memory forming a part of, or otherwise operatively associated with, the controller 122.

Figure 2:
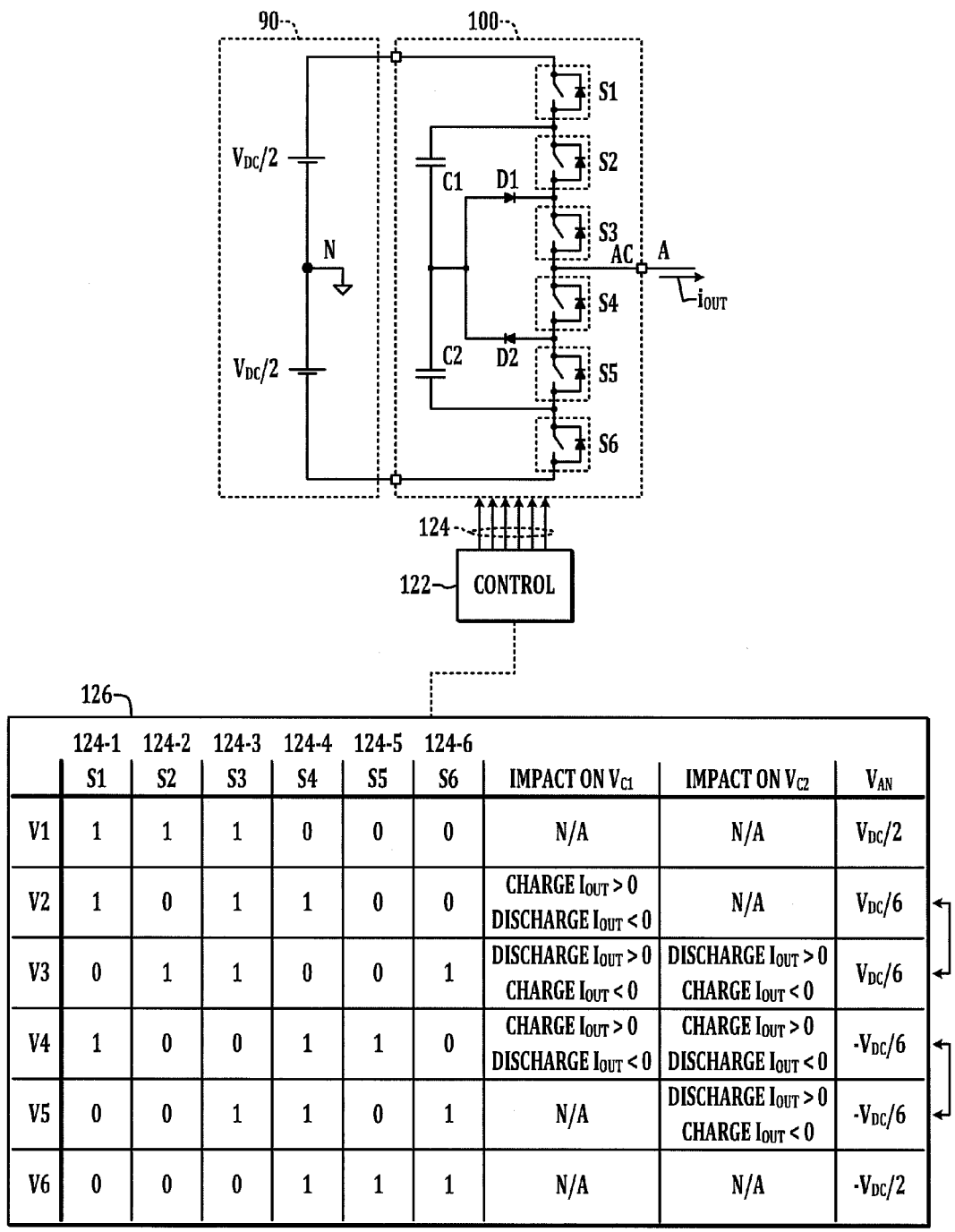
FIG. 2 is a partial schematic diagram illustrating an exemplary set of switching states for the NNPC power converter of FIG. 1 to provide a four-level voltage output with substantially equally spaced steps.
Figure 3:
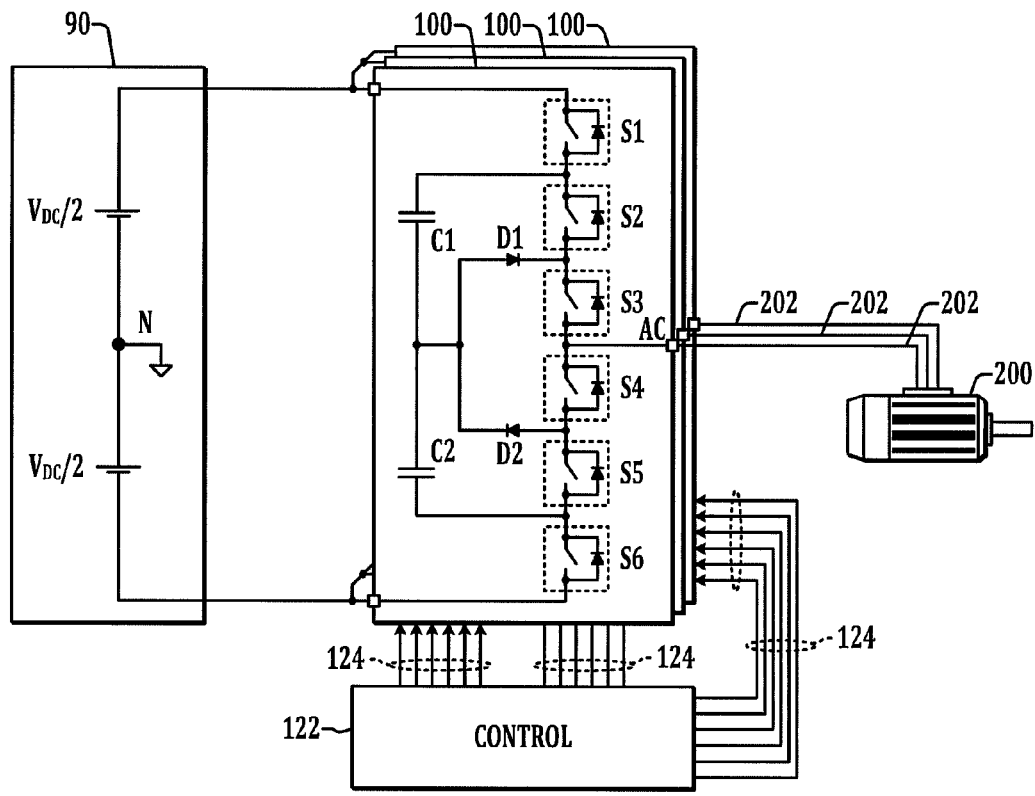
FIG. 3 is a schematic diagram illustrating three NNPC power converters and associated DC supplies for providing a three-phase voltage output to drive a motor load.
Figure 4:
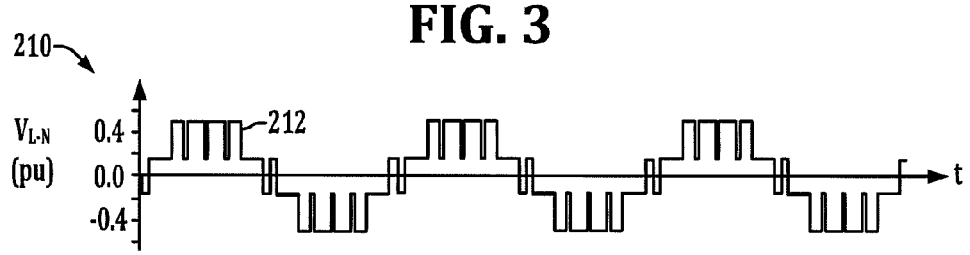
FIG. 4 is a graph showing a four-level line-to-neutral voltage output waveform for the NNPC power converter of FIGS. 1 and 2.
Figure 5:
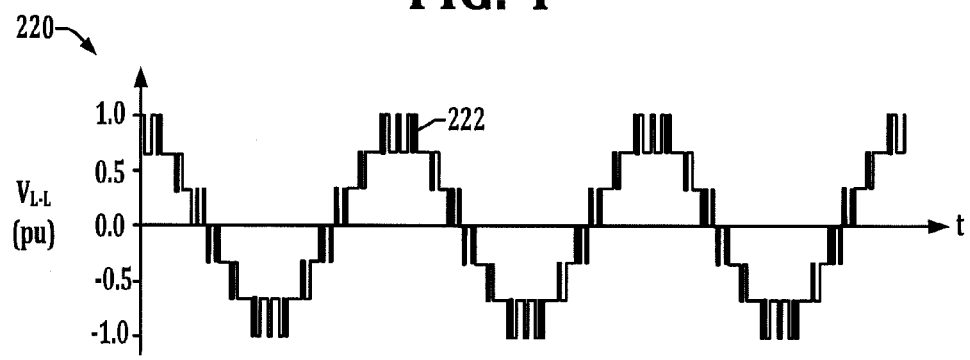
FIG. 5 is a graph illustrating a seven-level line-to-line voltage output waveform for the three-phase motor drive implementation of FIG. 3.

As best seen in FIG. 2, the switching control signals 124 are provided to the switches S1-S6 in pulse width modulated form so as to provide a multilevel output voltage (e.g., line-to-neutral voltage $V_{AN}$) at the inverter output node 116. In the illustrated embodiment, for instance, the controller 122 provides the switching control signals 124 to the switches S1-S6 so as to provide the output voltage $V_{AN}$ at one of four distinct line-to-neutral voltage levels. A graph 210 in FIG. 4 illustrates an exemplary four-level line-to-neutral voltage waveform 212 ($V_{AN}$) at the inverter output node 116 relative to the neutral node "N". As seen in FIG. 3, moreover, three different NNPC converter stages 100 may be connected to corresponding DC sources 90 to provide AC output voltages to motor phase lines 202 to drive a three-phase motor load 200, with the controller 122 providing a set of switching control signals 124 to each of the NNPC stages 100. FIG. 5 illustrates a graph 220 showing an exemplary line-to-line voltage waveform 222 in the system of FIG. 3, in which the controlled switching of the three NNPC stages 100 at relative phase angles of 120° provides a seven-level line-to-line voltage waveform 222.

Moreover, the provision of the switching control signals 124 in certain embodiments operates to control charging and discharging of the switched capacitors C1 and C2 in order to regulate the corresponding capacitor voltages $V_{C1}$ and $V_{C2}$ to a target fraction of the DC input voltage $V_{DC}$ received at the first and second DC inputs 101, 102. The control of the capacitor voltages $V_{C1}$ and $V_{C2}$, moreover, facilitates substantially equal distribution of the voltages seen at the individual switching devices S1-S6, thus providing significant advantages. FIG. 2 illustrates an exemplary switching state table 126 showing six possible switching vectors V1, V2, V3, V4, V5 and V6 corresponding to different switching states of the NNPC switching devices S1-S6, along with corresponding line-to-neutral voltage values relative to the input DC level $V_{DC}$, where a "1" indicates the corresponding switch S is 'on' or conductive. In operation, the first vector V1 provides an output voltage level of $+V_{DC}/2$, the second and third switching vectors V2 and V3 are redundant with one another relative to the line-to-neutral output voltage, each yielding a value of $+V_{DC}/6$. Vectors V4 and V5 are also a redundant switching state pair, each providing an output value of $-V_{DC}/6$, and the final switching state or vector V6 yields an output voltage of $-V_{DC}/2$. As seen in FIG. 2, moreover, the charging and discharging of the capacitors C1 and C2 is controlled through redundant vector selection, where the effect on the corresponding capacitor voltages may be different for the redundant switching states allowing intelligent vector selection to control the capacitor charging and/or discharging. For example, if the desired output voltage level is to be $V_{DC}/6$, vector V2 can be selected to charge C1 if the output current $I_{OUT}$ is positive (>0), or to discharge C1 if the output current is negative. Alternatively selection of the redundant vector V3 discharges C1 and C2 for positive output current, and charges these capacitors C1 and C2 if the output current is negative. As seen in the table 126 of FIG. 2, moreover, similar charging and/or discharging choices can be made by selection from among redundant vectors V4 and V5 where the desired output voltage level is $-V_{DC}/6$.

Figure 6:
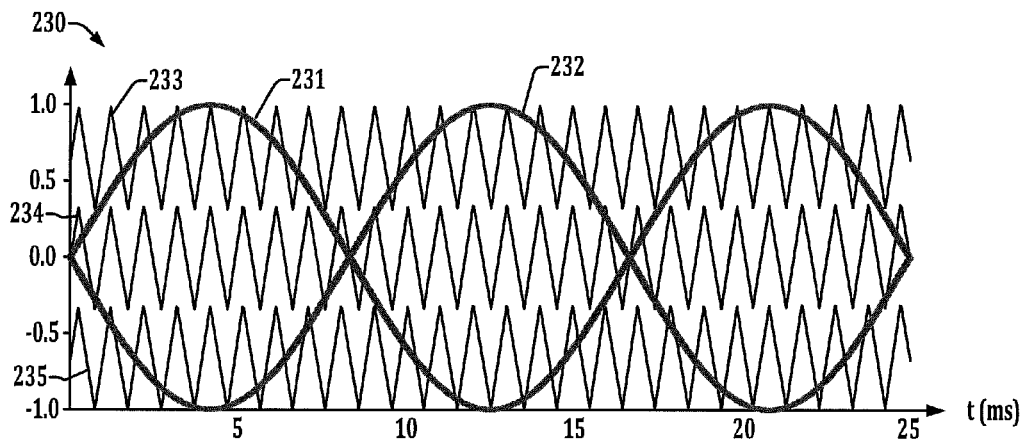
FIG. 6 is a graph illustrating an exemplary level shifted pulse width modulation implementation in the NNPC power converter controller of FIGS. 1 and 2.
Figure 7:
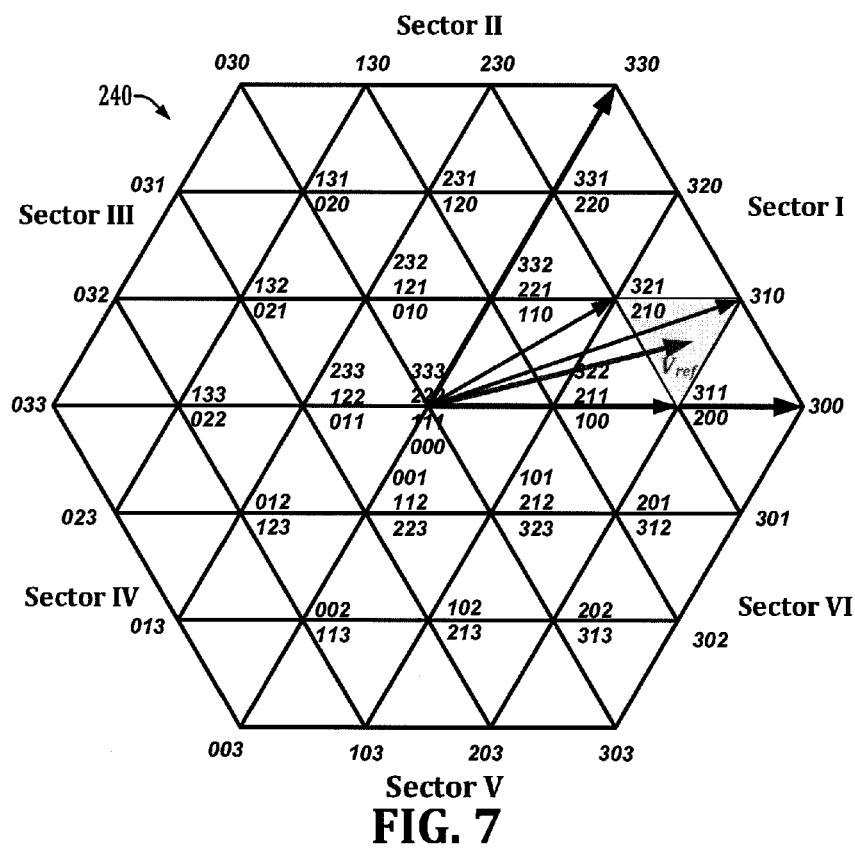
FIG. 7 is a graph illustrating an exemplary space vector modulation technique for providing pulse width modulated switching control signals in the NNPC power converter controller of FIGS. 1 and 2.

Referring also to FIGS. 6 and 7, any suitable form of pulse width modulation switching control signal generation technique can be used in the controller 122. A graph 230 in FIG. 6 illustrates an exemplary carrier-based pulse width modulation implementation, in which opposite polarity modulating signals 231 and 232 are used along with level shifted triangular carrier waveforms 233, 234 and 235 for generating the switching control signals 124 for the six converter switches S1-S6. In another possible embodiment, space vector modulation can be used as shown in the graph 240 of FIG. 7, where the controller 122 determines relative on times for three control vectors $V_1$, $V_2$ and $V_3$ surrounding the current position of a reference vector $V_{ref}$ as shown, where the reference vector $V_{ref}$ has a corresponding modulation index (M) and corresponding phase angle θ, and rotates throughout the space vector modulation diagram 240 according to a desired motor load position and torque in certain motor drive implementations.

Figure 8:
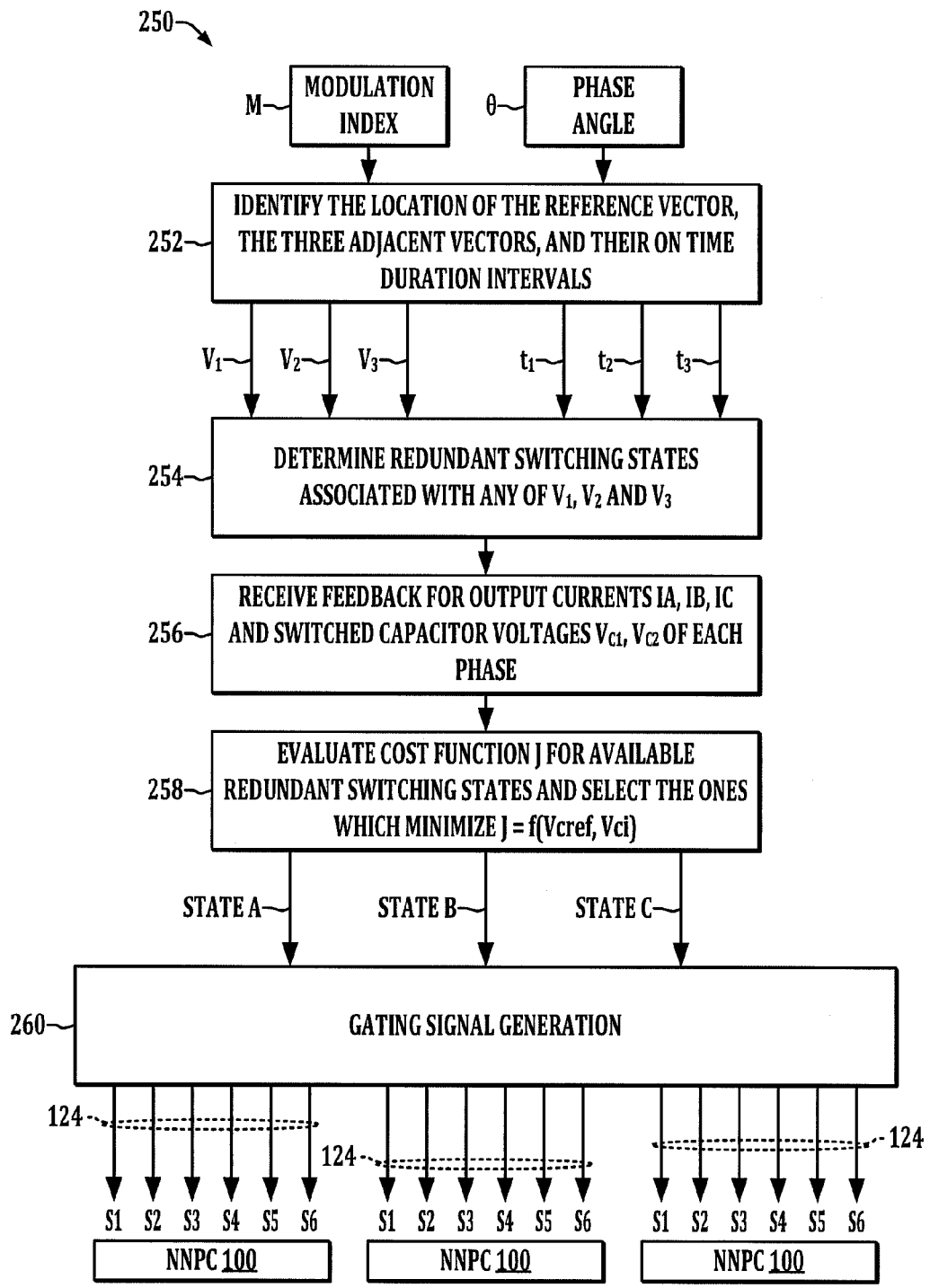
FIG. 8 is a flow diagram illustrating an exemplary pulse width modulation process in the NNPC power converter controller of FIGS. 1 and 2 to provide switching control signals to one or more NNPC power converters to provide a multilevel output voltage at the inverter output node and to control charging and discharging of the flying capacitors to a predetermined level.

Referring to FIGS. 2 and 8, a process 250 is illustrated in the flow diagram of FIG. 8 for generating pulse width modulated switching control signals 124, which can be implemented in the controller 122 of the NNPC power converter controller of FIGS. 1 and 2. The process 250 is illustrated and described below in the form of a series of acts or events, although the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 250 and other methods of the disclosure may be implemented in hardware, processor-executed software, or combinations thereof, such as in the exemplary controller 122, and may be embodied in the form of computer executable instructions stored in a tangible, non-transitory computer readable medium, such as in a memory operatively associated with the controller 122 in one example.

In operation, the switching control signals 124 are provided to the NNPC switches S1-S6 to generate the multilevel output voltage $V_{AN}$ and to control charging and discharging of the capacitors C1 and C2. The example of FIG. 8 is for a three phase system (e.g., FIG. 3 above), in which the controller 122 performs space vector modulation to generate the switching control signals 124 for each of the three NNPC converters 100 associated with the motor phases A, B and C. In certain implementations, the selection of redundant switching vectors (e.g., from table 126 in FIG. 2) is done based on one or more feedback values regarding the output current $i_{OUT}$ (e.g., $I_A$, $I_B$, and $I_C$ for the three-phase example) and switched capacitor voltages $V_{C1}$ and $V_{C2}$ for each of the NNPC converters 100. As seen in FIG. 8, the illustrated process 250 shows space vector modulation processing, in which the desired output state (e.g., motor position and torque) is determined according to a received modulation index "M" and phase angle ⊖. These are received and used at 252 to identify the location of the reference vector $V_{ref}$ (FIG. 7). The reference vector, in turn, is used to identify the three surrounding control vectors $V_1$, $V_2$ and $V_3$ (e.g., FIG. 7), and space vector modulation processing is used to determine the corresponding "on-time" duration intervals $t_1$, $t_2$ and $t_3$ at 252 in FIG. 8. At 254, the control vectors and duration intervals are used to determine the redundant switching states (if any) for each motor output phase that are associated with one, some or all of the surrounding vectors $V_1$, $V_2$ and $V_3$. For example, the state table 126 in FIG. 2 indicates that vector switching states V2 and V3 are redundant with one another, as are V4 and V5. Feedback is received at 256 for the output currents $I_A$, $I_B$, and $I_C$ as well as the switched capacitor voltages $V_{C1}$ and $V_{C2}$ for each phase.

At 258 in FIG. 8, the controller 122 evaluates a cost function "J" for the available redundant switching states for each motor phase, and selects from the redundant states those that minimize the cost function for the individual phases. In the illustrated example, the cost function relates to the capacitor voltages (Vci), such as the voltages $V_{C1}$ and $V_{C2}$ in FIG. 1 above, and the function uses a desired or predetermined reference value to which these capacitor voltages are to be regulated (Vcref in FIG. 8). In accordance with certain aspects of the present disclosure, unlike conventional NPC power converters, the target regulated flying capacitor voltage value Vcref in certain embodiments is less than $V_{DC}/2$. For example, in the example of FIG. 1, the capacitor voltages $V_{C1}$ and $V_{C2}$ are controlled or regulated through intelligent redundant switching vector selection by the controller 122 to be $V_{DC}/3$. In other nonlimiting examples, the target value Vcref can be another value that is less than half the DC input voltage, such as $V_{DC}/4$ (FIG. 26 below) or $V_{DC}/5$ (FIG. 27).

With the switching vectors selected for each of the three phases, gating signal generation is performed by the controller 122 at 260 in FIG. 8 in order to generate the three sets of switching control signals 124 for the switching devices S1-S6 of each corresponding NNPC converter stage 100. In this manner, the controller 122 operates to cause the appropriate output voltages to be provided to the motor load 200 (FIG. 3) and also regulates the voltages across the capacitors C1 and C2 of each of the NNPC power stages 100. This careful regulation of the switched capacitor voltages $V_{C1}$ and $V_{C2}$, in turn, facilitates operation of the NNPC converters 100 to provide the output voltages (e.g., $V_{AN}$ in FIG. 2) at substantially equally spaced output levels. For instance, in the example of FIG. 2, the output voltages are provided at four distinct levels, spaced in steps of $V_{DC}/3$. Thus, the use of a regulated lower capacitor voltage level in the illustrated NNPC converters 100 facilitates equal distribution of the voltages seen by the switching devices S1-S6. Consequently, all the switching devices S1-S6 experience the same voltage stress, and none of the devices need be oversized.

Figure 9:
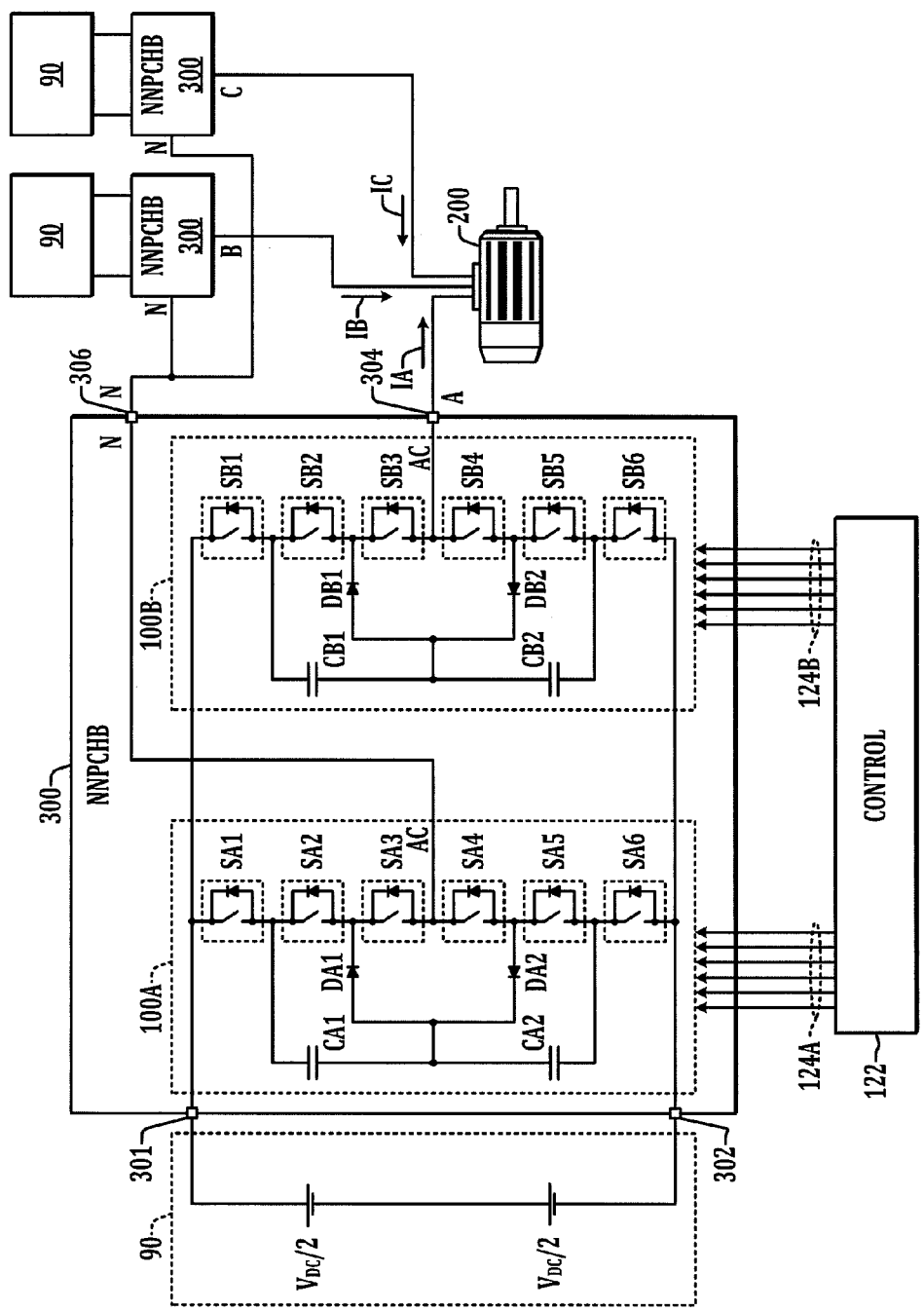
FIG. 9 is a schematic diagram illustrating an NNPC H-bridge (NNPCHB) power conversion system including two NNPC power converter stages with an inverter output of the first stage providing a system neutral and the inverter output of the second stage providing a line voltage output to drive a motor load.

Referring also to FIGS. 9-12, a power converter 300 is illustrated in FIG. 9, including two NNPC stages 100A and 100B as described above in connection with FIGS. 1 and 2, connected in an H-bridge configuration, referred to herein as an NNPC H-bridge (NNPCHB). The NNPCHB converter 300 includes DC input terminals 301 and 302 receiving input DC voltage from a source 90 as described above, with the input terminals 301 and 302 being connected to the DC inputs of both of the NNPC stages 100A and 100B as shown. Similar to the NNPC converter stage 100 of FIG. 1, the first stage 100A in FIG. 9 includes switching devices SA1, SA2, SA3, SA4, SA5 and SA6, as well as clamping switches or other clamping elements DA1 and DA2 and capacitors CA1 and CA2 having corresponding voltages $V_{CA1}$ and $V_{CA2}$ (e.g., $V_{DC}/k$, where k>2). Likewise, the second stage 100B includes switches SB1, SB2, SB3, SB4, SB5 and SB6, as well as clamping elements DB1 and DB2 and capacitors CB1 and CB2 with corresponding capacitor voltages $V_{CB1}$ and $V_{CB2}$ (e.g., $V_{DC}/k$, where k>2). The switching devices DA1, DA2, DB1 and DB2 are shown as diodes in the drawing, but active switches such as IGBTs and IGCTs can also be used for clamping elements.

The inverter output node 116 of the converter 100A in FIG. 9 is connected to a system neutral node 306, and the inverter output node 116 of the second multilevel power converter 100B provides an AC output 304 for the power conversion system 300. The controller 122 in this case provides switching control signals 124A to the first NNPC converter 100A as well as a set of switching control signals 124B to the second NNPC stage 100B. In one nonlimiting embodiment, the controller 122 provides the switching control signals according to a switching state or vector table 310 shown in FIGS. 10A-10D by selection of a given vector V1-V36 to provide a desired line-to-neutral voltage $V_{AN}$ at one of seven possible levels. As further seen in FIG. 9, moreover, three sets of NNPCHB converters 300 may be provided, with along with corresponding DC sources 90 to provide output voltages for driving a three phase motor load 200, with the controllers 122 of the corresponding converters 300 providing switching control signals 124 according to the table 310, where the output voltages for the corresponding motor phases are shifted in one possible implementation by 120°.

As seen in FIGS. 10A-10D, with the corresponding switched capacitors regulated to voltages of $V_{DC}/3$, the equally spaced output voltage levels possible (line-to-neutral) include $V_{DC}$ (vector V1), $2V_{DC}/3$ (V2-V5), $V_{DC}/3$ (vectors V6-V13), 0 volts (vectors V14-V23), $-V_{DC}/3$ (vectors V24-V31), $-2V_{DC}/3$ (vectors V32-V35) and $-V_{Dc}$ for vector V36. In addition, as seen in the table 310, the voltage output steps are all equal ($V_{DC}/3$). A graph 320 in FIG. 11 illustrates an exemplary seven-level line-to-neutral output voltage waveform 322 for the NNPC H-bridge power converter 300 in FIG. 9. Moreover, in the illustrated three-phase example, FIG. 12 shows a graph 330 with an exemplary 13-level line-to-line voltage output waveform 332.

In addition, as in the NNPC embodiments 100 described above, the controller 122 in the NNPCHB converters 300 advantageously selects from among redundant vectors, where possible, in order to regulate the switched capacitor voltages across the capacitors of the constituent NNPC stages 100A and 100B. For example, the redundant vectors V2-V5 (FIG. 10A) provide the capability to selectively charge or discharge the component capacitors CA1, CA2, CB1 and CB2 of the NNPC stages 100A and 100B, based on the polarity of the output current IA for the output level $2V_{DC}/3$, and other redundant vector groups are shown in the table 310 allowing the controller 122 to advantageously regulate the capacitor voltages $V_{CA1}$, $V_{CA2}$, $V_{CB1}$ and $V_{CB2}$ to a desired level. In this regard, the controller 122 may employ the process 250 of FIG. 8 as described above in operating the converter 300 in certain embodiments. Moreover, space vector modulation or carrier-based pulse width modulation techniques can be employed for generating the switching control signals 124 in the NNPCHB converter 300.

Figure 13:
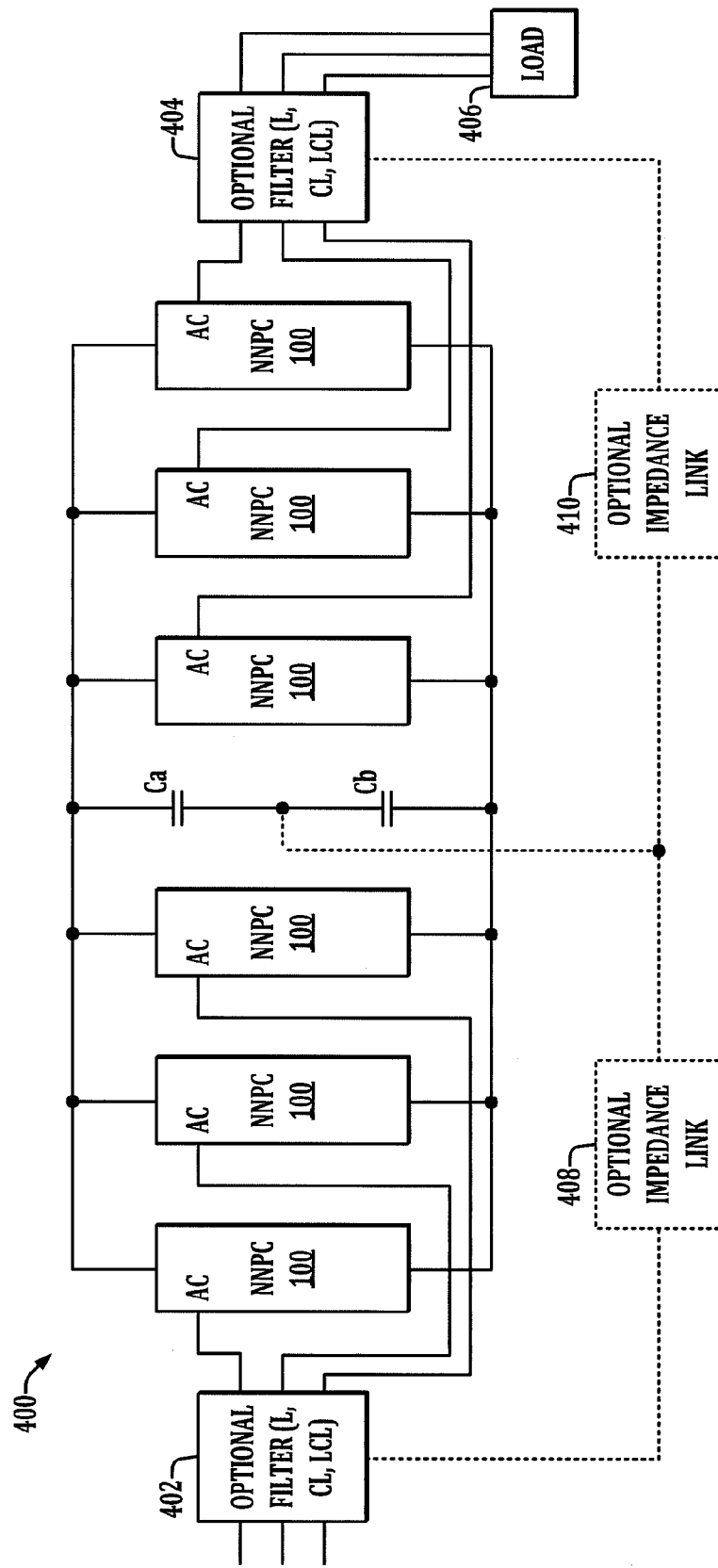
FIG. 13 is a schematic diagram illustrating an exemplary three-phase power conversion system with three NNPC power converters configured to provide three-phase rectification for generating a DC bus voltage, and three NNPC power converters providing a three-phase AC output, with a DC bus midpoint node connected through optional impedance links to optional input and output filters.
Figure 14:
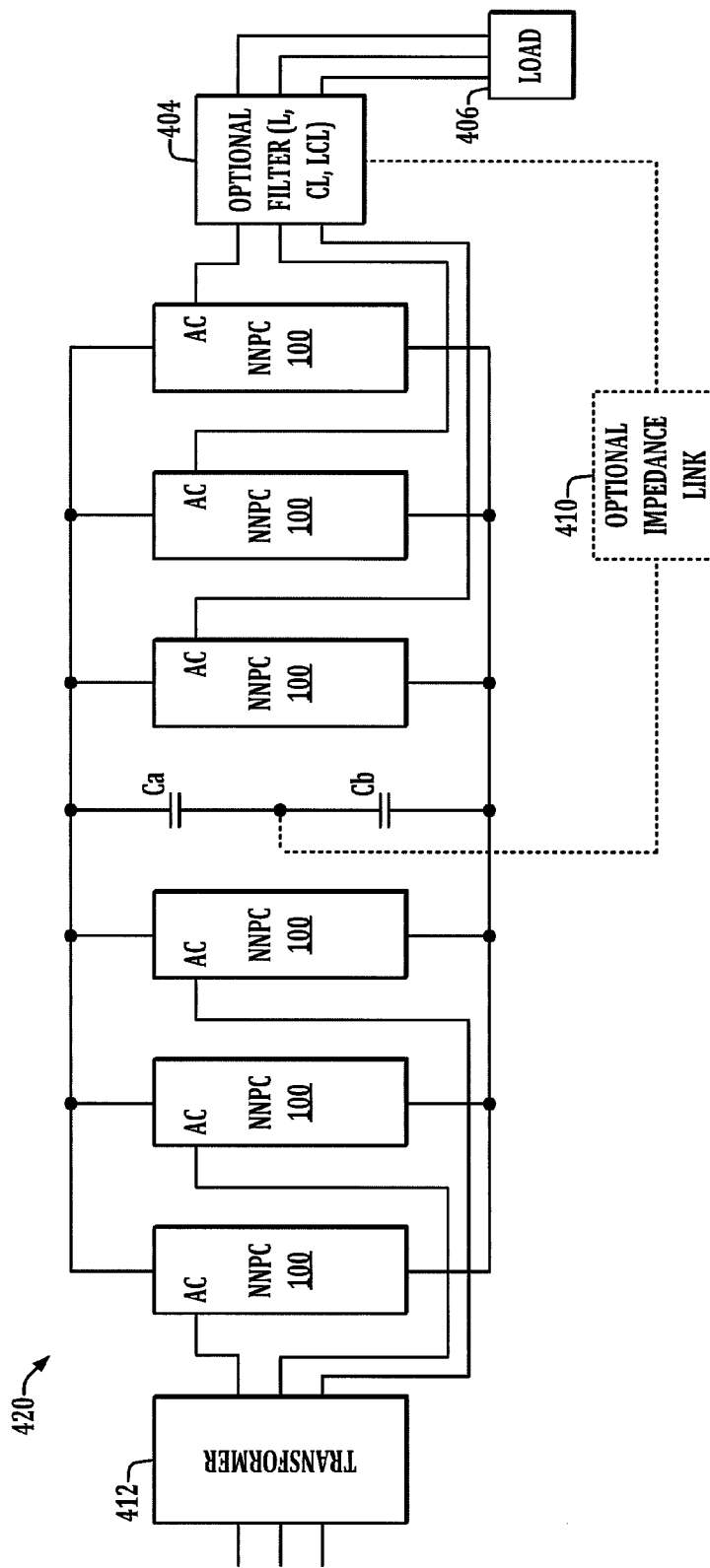
FIG. 14 is a schematic diagram illustrating another exemplary three-phase power conversion system with three NNPC converters providing rectification and three NNPC converters providing an AC output, with an input transformer and a DC bus midpoint node connected through an optional impedance link to an output filter.

Referring also to FIGS. 13-17, further aspects of the disclosure provide multilevel power conversion systems 400, 420, 430, 440 and 450 having multiple NNPC power converters 100 and/or multiple NNPCHB converters 300. FIG. 13 shows a nonlimiting example 400 including three NNPC converters 100 coupled to an AC input power source via an optional filter 402 (inductor L, capacitor-inductor CL, LCL, etc.) which operate to receive incoming AC voltages at the corresponding AC input terminals (e.g., terminal 120 in FIG. 1 above), with DC terminals connected to positive and negative DC bus rails, whereby the first set of three NNPC converters 100 provides a three phase active rectifier. The output of these rectifier stages provides a DC bus voltage across DC bus capacitances Ca and Cb as shown. In certain implementations, a neutral point of the optional input filter 402 may be connected to the DC bus midpoint or center node joining the DC bus capacitors Ca and Cb via an optional impedance link 408. The DC bus voltage is provided as an input to the DC input terminals (terminals 101 and 102 in FIG. 1 above) of another set of three NNPC stages 100, with the inverter outputs of these stages 100 providing AC output voltages to drive a load 406 through an optional filter 404. In addition, as seen in FIG. 13, the midpoint of the DC bus may optionally be connected to a neutral of the output filter 404 via an optional impedance link 410. FIG. 14 illustrates another three-phase system 420 similar to that of FIG. 13 above, with an input transformer 412 providing the AC input power to the first set of NNPC converters 100. The systems 410 and 420 of FIGS. 13 and 14 may be used, in one non-limiting example, to provide a desired output voltage, for example 2 kV-7.2 kV, using a back-to-back configuration of six NNPC stages 100 for a total of 36 switches and 12 clamping diodes which can also be active clamping switches, where the example 420 in FIG. 14 additionally provides isolation via the transformer 412.

Figure 15:
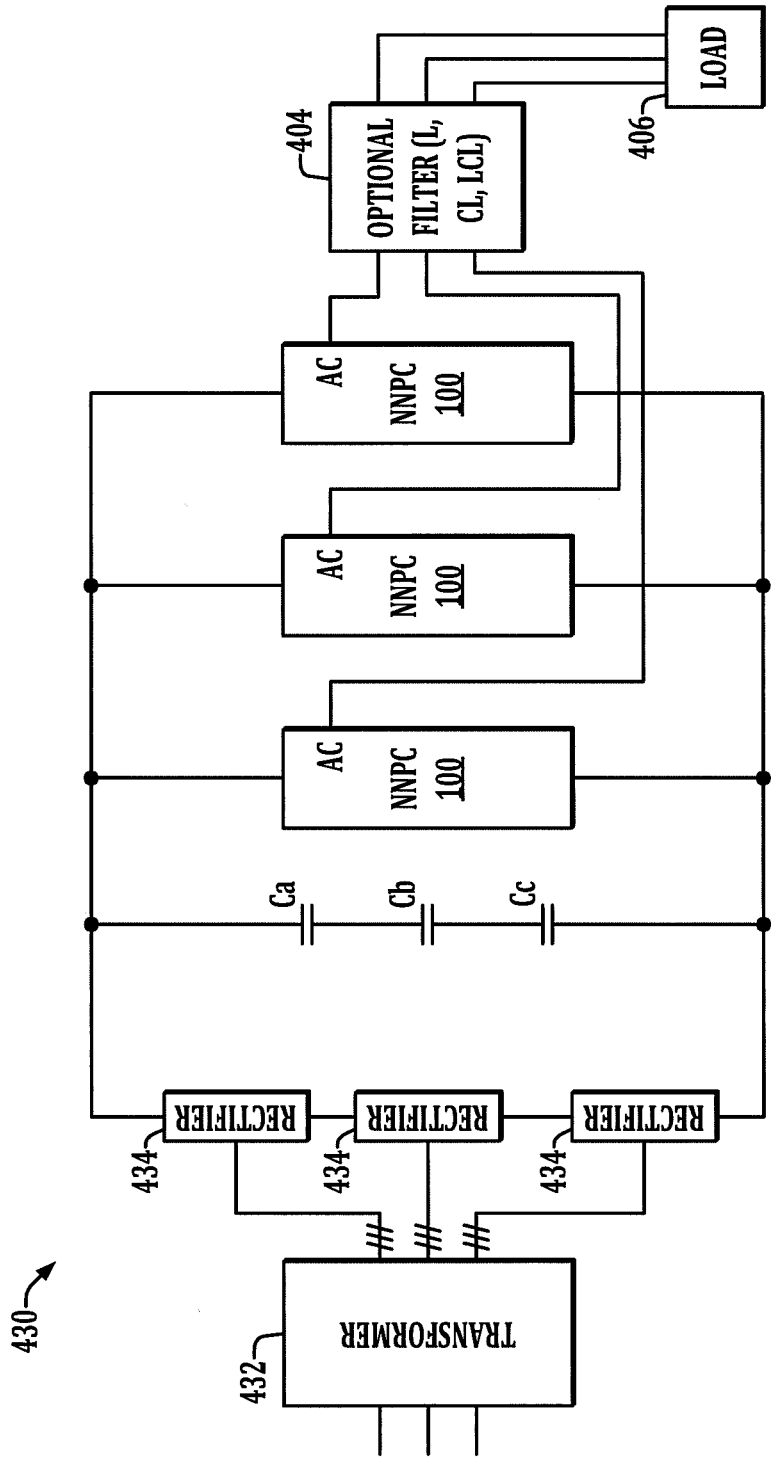
FIG. 15 is a schematic diagram illustrating a multi-phase power conversion system using three series-connected input rectifiers providing a DC bus to power NNPC converters for three output phases.

FIG. 15 shows another multiphase system 430 having an input transformer 432 providing three-phase secondaries to each of a set of three rectifiers 434 to provide a DC bus across capacitors Ca, Cb and Cc. The DC voltage across the resulting bus is provided to the DC input terminals of a set of three NNPC stages 100 whose AC outputs drive a three-phase load 406 through an optional output filter 404. The rectifiers 434 in certain embodiments can be diode rectifiers, SCR rectifiers, two-level, NPC three-level or NNPC four-level IGBT/IGCT rectifiers. The transformer 432 and the rectifiers 434 can also be of different pulse numbers, such as 6-pulse, 12-pulse, 24-pulse, etc. in certain embodiments.

Figure 16:
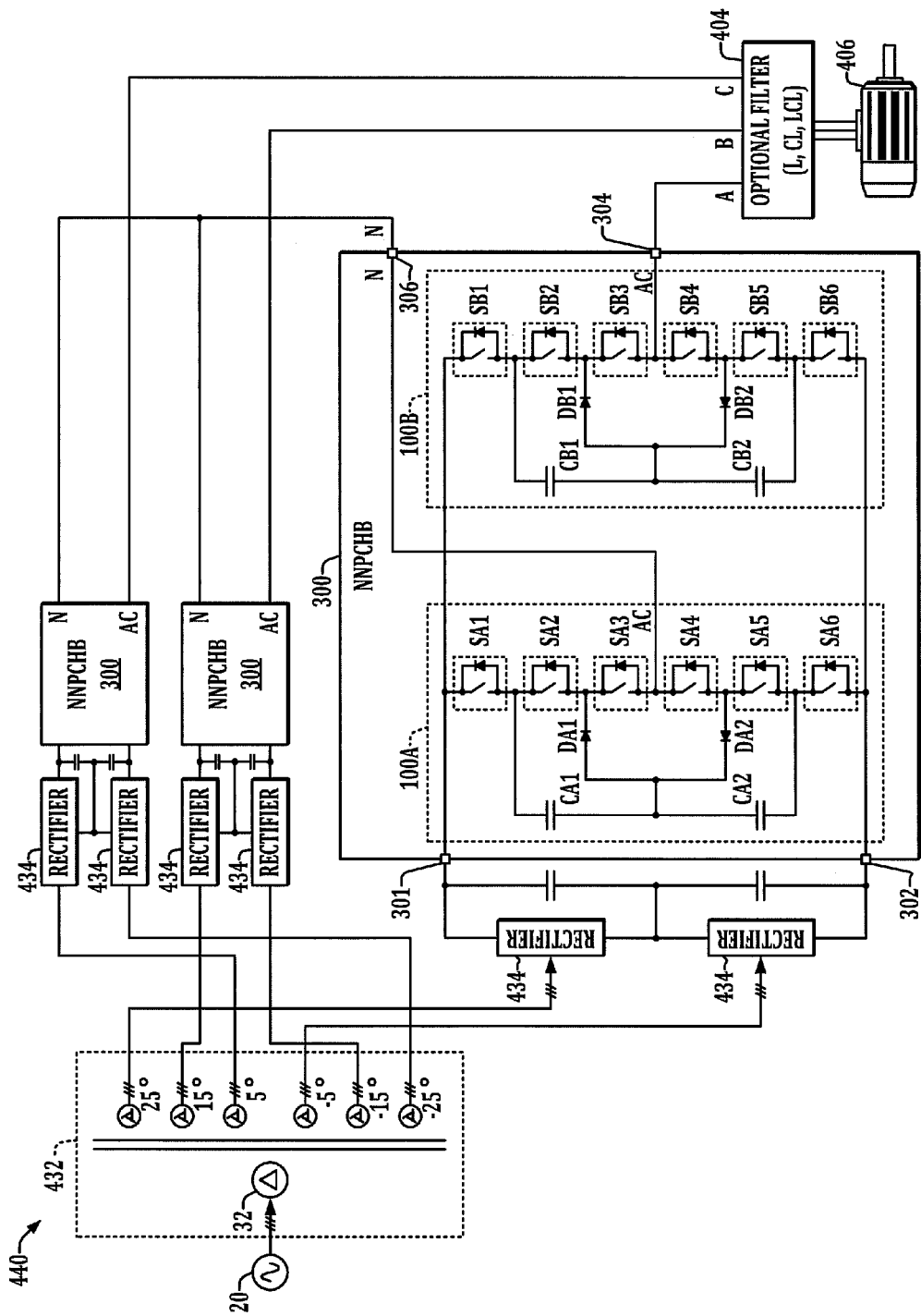
FIG. 16 is a schematic diagram illustrating another exemplary three-phase power conversion system with NNPC H-bridge (NNPCHB) converter stages for each of three output phases, individually driven by a multi-pulse rectifier.

FIG. 16 shows another three-phase power conversion system 440 with a phase shifting input transformer 432 receiving power from an AC source 20 via a primary 32, and providing six separate three-phase secondaries at exemplary angles of 25°, 15°, 5°, −5°, −15° and −25°, where each secondary drives a corresponding rectifier 434 as described above, and a set of three NNPCHB stages 300 (e.g., FIG. 9 above) are individually driven by two of the rectifiers 434 to provide AC outputs through an optional output filter 404 to drive a three-phase motor load 406. In this example, an NNPC H-bridge multipulse rectifier system 440 is thus provided using a 36-pulse transformer 432 to achieve the desired output voltage for example 10 kV-15 kV. In one possible alternate implementation, dual 18-pulse transformers may be provided, or other combinations of phase shifting angles for certain pulse numbers are possible, or using different number of DC sources in series is also possible.

Figure 17:
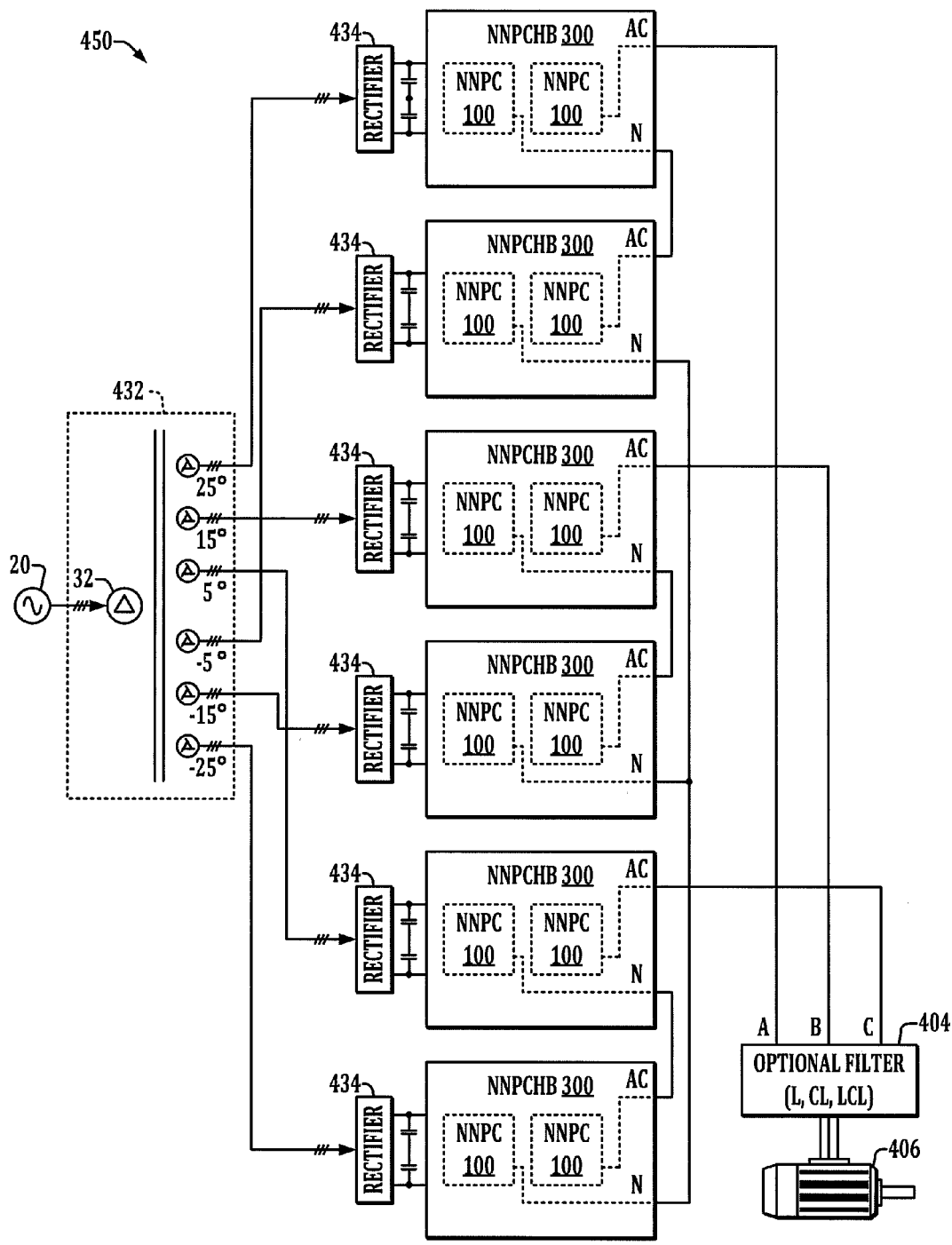
FIG. 17 is a schematic diagram illustrating another three-phase power conversion system with multiple cascaded NNPC H-bridge (NNPCHB) power converters for each phase.

FIG. 17 shows a cascaded NNPCHB system with a multipulse rectifier for desired output voltage, for example, 10 kV-15 kV, again using a 36-pulse transformer 432 as described above in connection with FIG. 16. In this case, each NNPC H-bridge stage 300 is powered by a corresponding rectifier 434 driven from a corresponding secondary of the transformer 432, where each stage 300 includes a pair of NNPC stages 100 connected as shown above in FIG. 9. In this regard, each output phase is driven by a pair of the NNPC H-bridge stages 300, with the AC output of a first stage 300 connected to a motor phase (via an optional output filter 404), and the neutral of that stage 300 is connected to the AC output of the second stage 300, with the neutral terminal of the second stage 300 being connected to a system neutral N. The number of transformer secondary windings and DC rectifiers, the phase shifting angles between the transformer secondary windings, and other design parameters can be varied for this cascaded NNPCHB topology.

Figure 19:
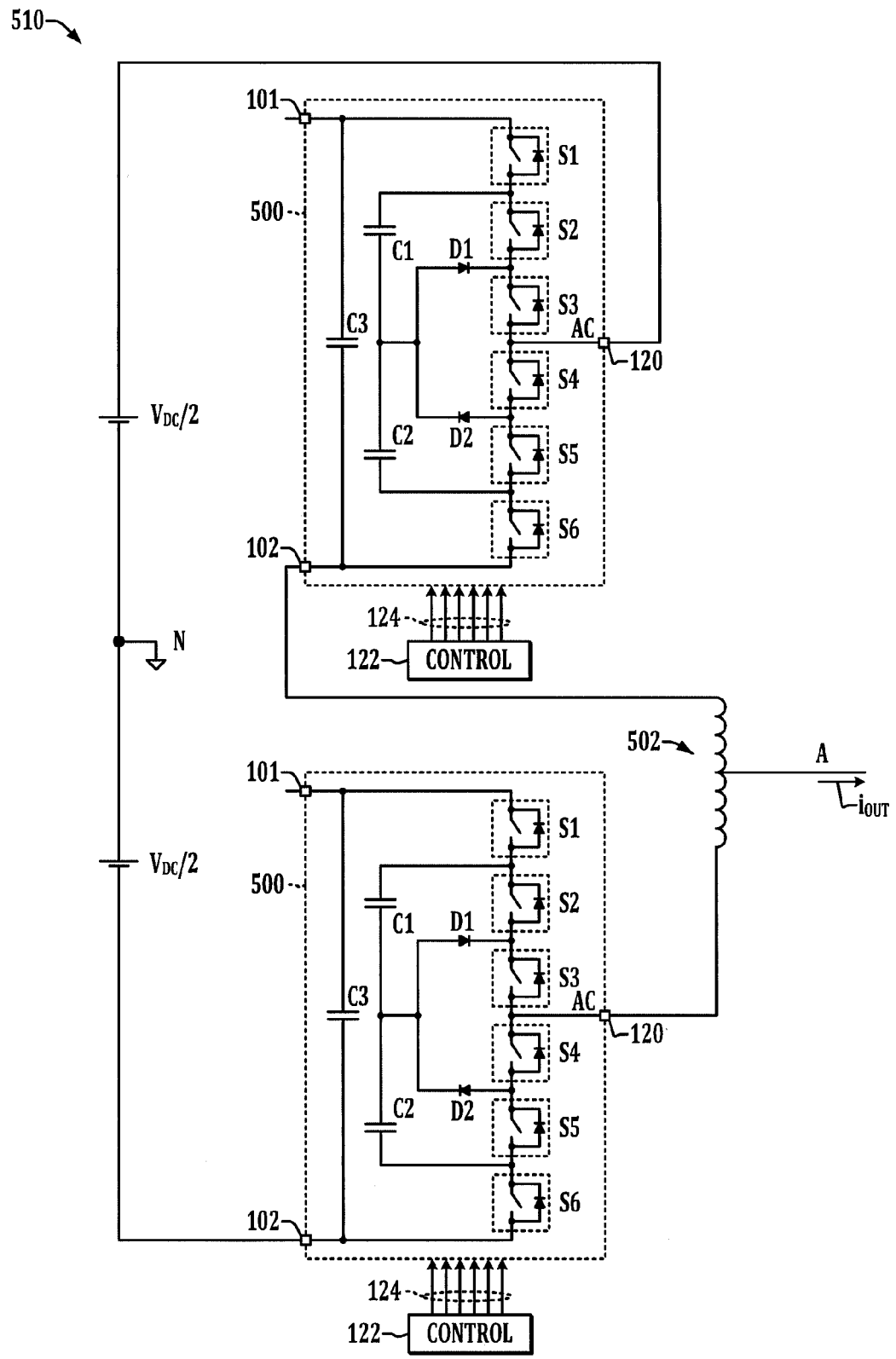
FIG. 19 is a schematic diagram illustrating two NNPC power converter stages of FIG. 18 connected in series with an inductor to form a modular output phase.
Figure 20:
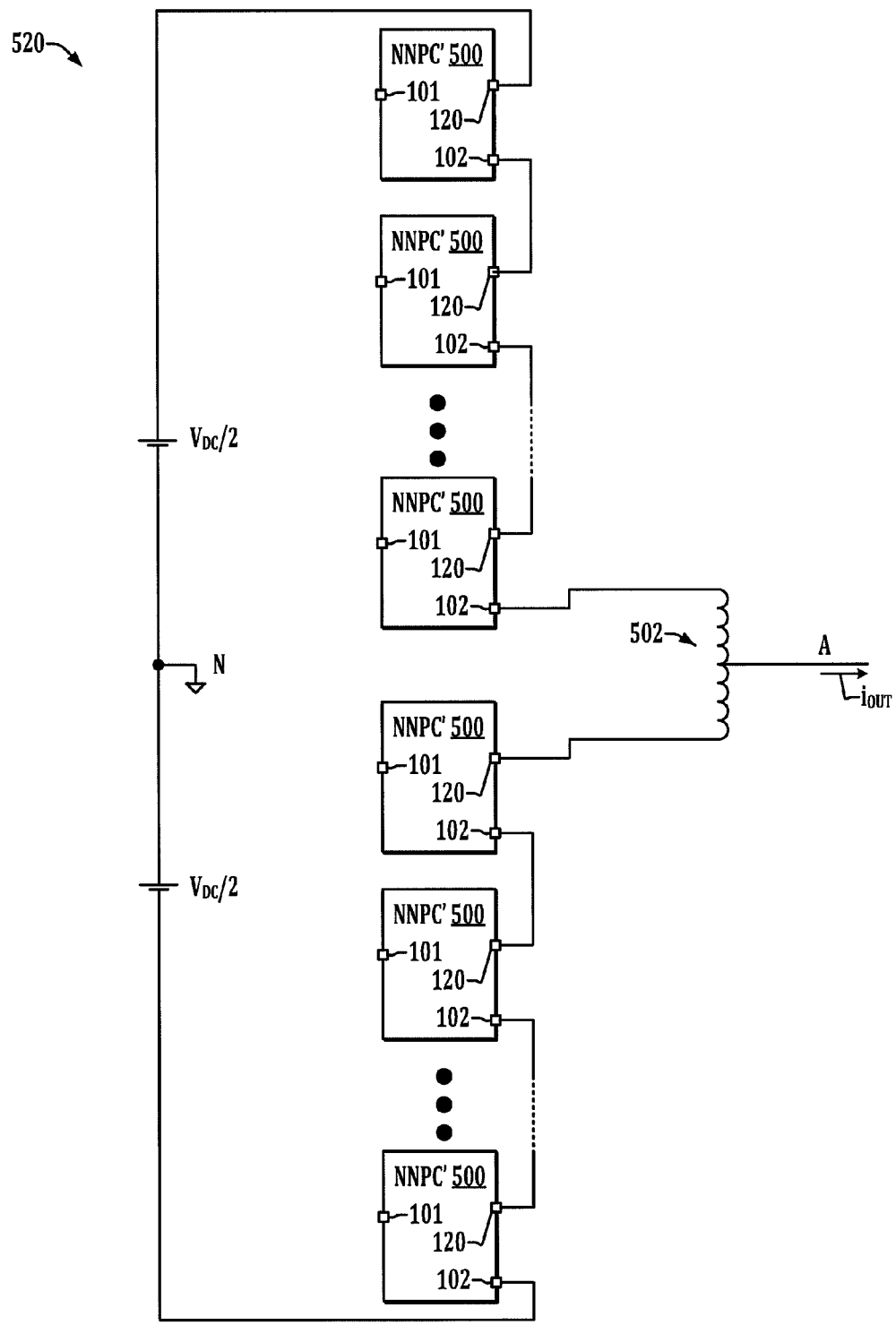
FIG. 20 is a schematic diagram illustrating an integer number NNPC power converter stages of FIG. 18 connected in series with an inductor to form a modular output phase.
Figure 21:
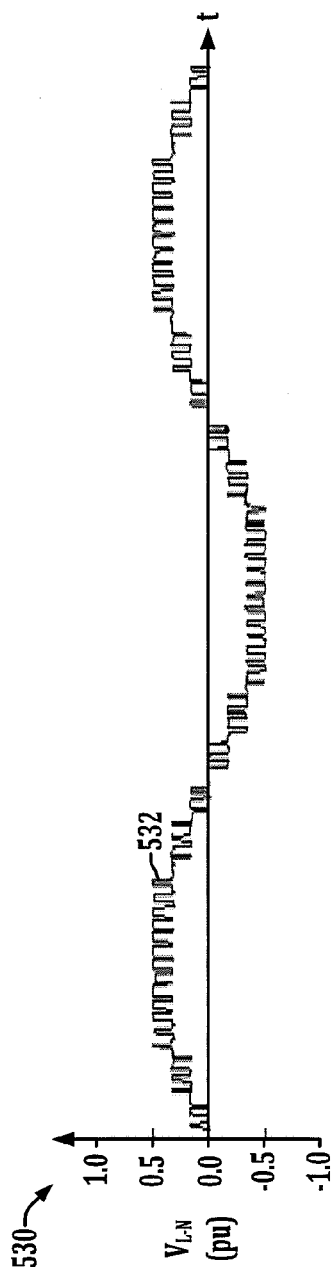
FIG. 21 is a graph illustrating a seven-level line-to-neutral voltage output waveform for the NNPC power converter stages of FIG. 19.
Figure 22:
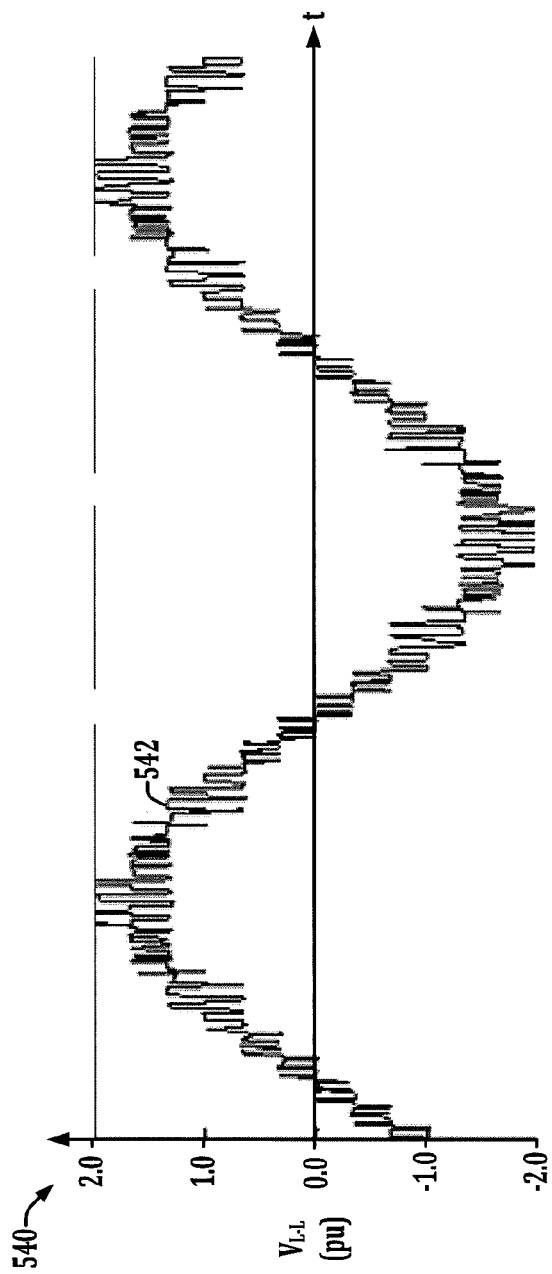
FIG. 22 is a graph illustrating a 13-level line-to-line voltage output waveform for the NNPC power converter stages of FIG. 19.

Referring also to FIGS. 18-22, FIG. 18 shows another NNPC power converter stage embodiment 500 (NNPC') with an integral capacitor C3 connected across the DC input terminals 101 and 102. FIG. 19 illustrates an exemplary system 510 employing two such NNPC' stages 500 for providing a phase output via an output inductor 502, with a positive DC voltage being applied to the AC terminal 120 of the first stage 500, and the lower DC terminal 102 of the first stage 500 being connected to one end of the inductor 502. The lower end of the inductor 502 is connected to the AC terminal 120 of the second stage 500, whose lower DC terminal 102 is connected to the lower (negative) terminal of the DC source. A center tap connection of the inductor 502 provides the phase output (A), and multiple such configurations 510 may be used to power a multiphase load (not shown). FIG. 20 shows an NNPC-based modular multilevel system 520, in which an integer number of NNPC' stages 500 are connected as described above, with a first set of stages 500 being connected between the upper DC line and the upper end of the inductor 502, and a second set of stages 500 being connected between the lower inductor terminal and the lower DC line. FIG. 21 provides a graph 530 showing an exemplary line-to-neutral voltage output waveform 532 for the system 510 of FIG. 19 (using two NNPC' stages 500) providing a seven level line-to-neutral output voltage. In addition, the graph 540 in FIG. 22 shows a corresponding multiphase line-to-line voltage output waveform 542 providing 13 voltage levels.

Figure 23:
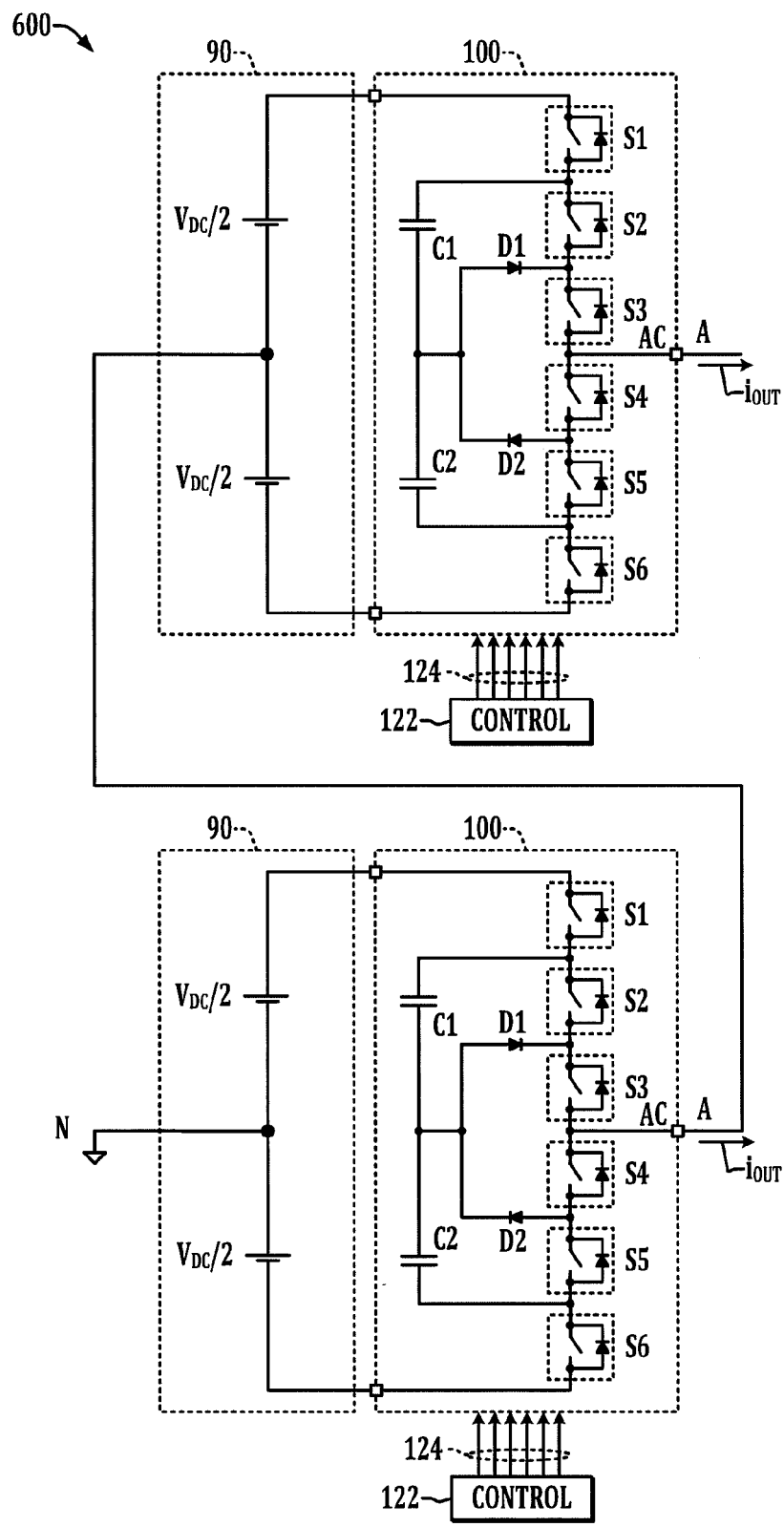
FIG. 23 is a schematic diagram illustrating a single phase of a cascaded NNPC-based power conversion system with an inverter output of a first NNPC converter connected to a DC supply midpoint node of a second NNPC converter.
Figure 24:
FIG. 24 is a graph showing an exemplary seven-level line-to-neutral voltage output waveform for the cascaded NNPC-based power conversion system of FIG. 23.
Figure 25:
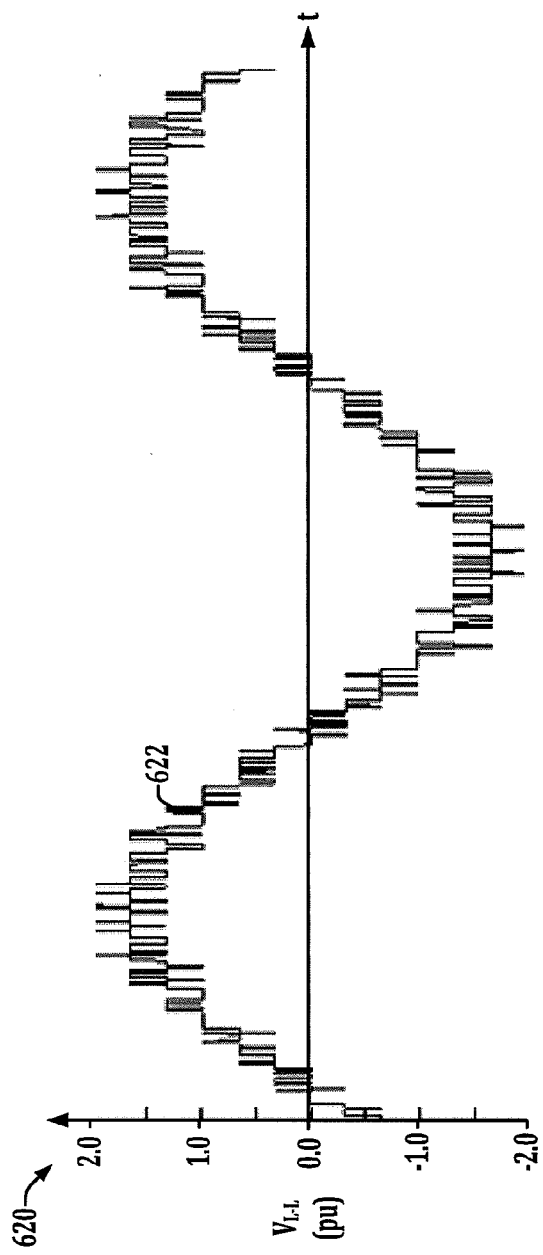
FIG. 25 is a graph illustrating an exemplary 13-level line-to-line voltage output waveform for the power conversion system of FIG. 23.

Referring also to FIGS. 23-25, FIG. 23 shows a single phase of another exemplary system 600 using a cascaded NNPC configuration of two NNPC cells or stages 100 and corresponding DC supplies 90. Other implementations are possible using more than two NNPC cells 100 connected in similar fashion. As seen in the example of FIG. 23, a system neutral "N" is connected to a midpoint of the DC input source 90 for a first cell 100 whose AC output is connected to the midpoint of the DC source 90 for the upper (second) cell 100. The AC output of the second cell 100, in turn, provides the output voltage for the phase being driven by the system 600. In this configuration, the operation of the controller(s) 122 provides a seven-level line-to-neutral output voltage waveform 612 as shown in the graph 610 of FIG. 24, as well as a 13-level line-to-line output waveform 622 in the graph 620 of FIG. 25 for multiphase implementations.

Figure 26:
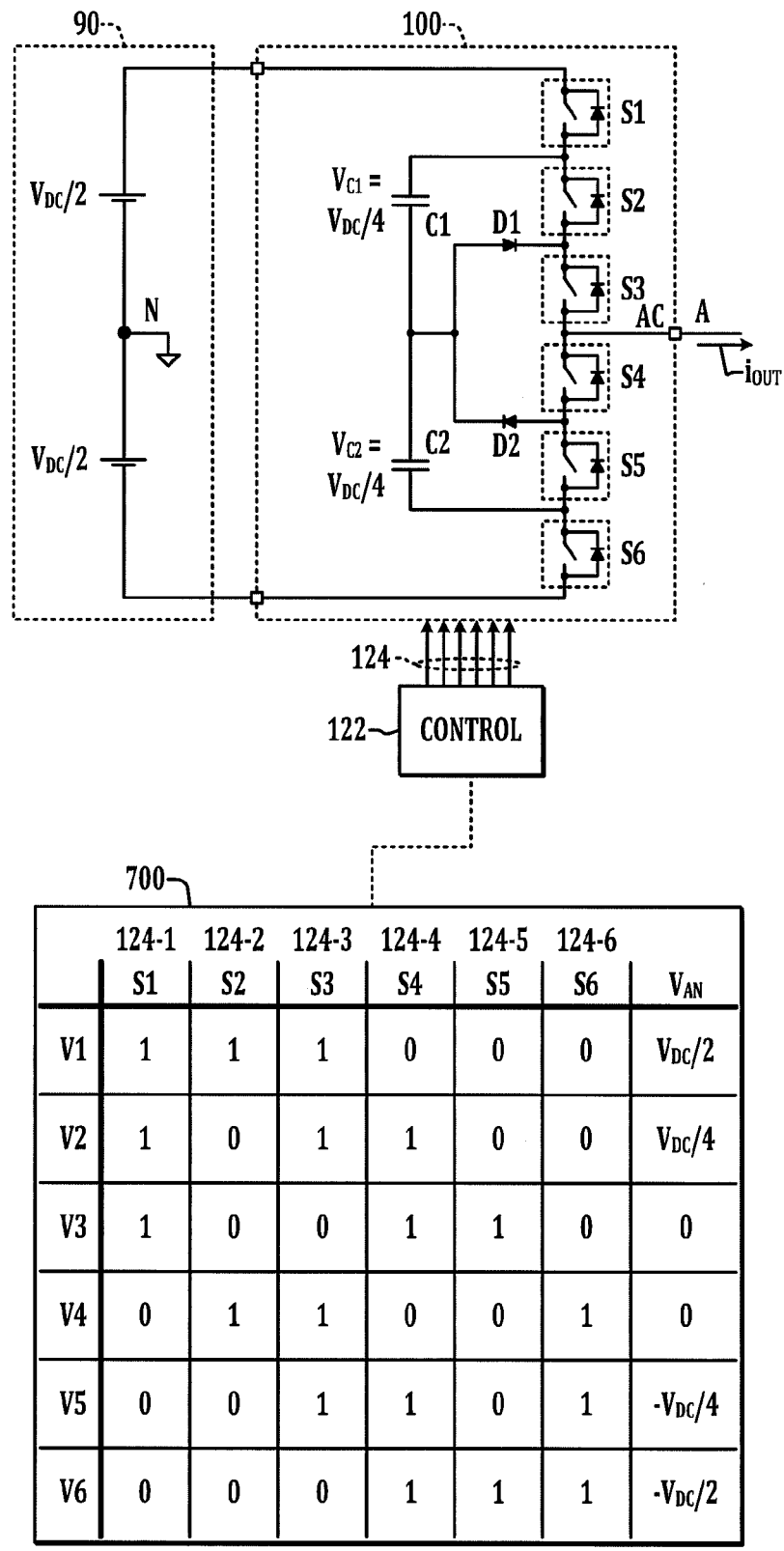
FIG. 26 is a partial schematic diagram illustrating another exemplary NNPC power converter and associated switching table in which the controller regulates the switched capacitor voltage to one fourth of the DC input voltage.
Figure 27:
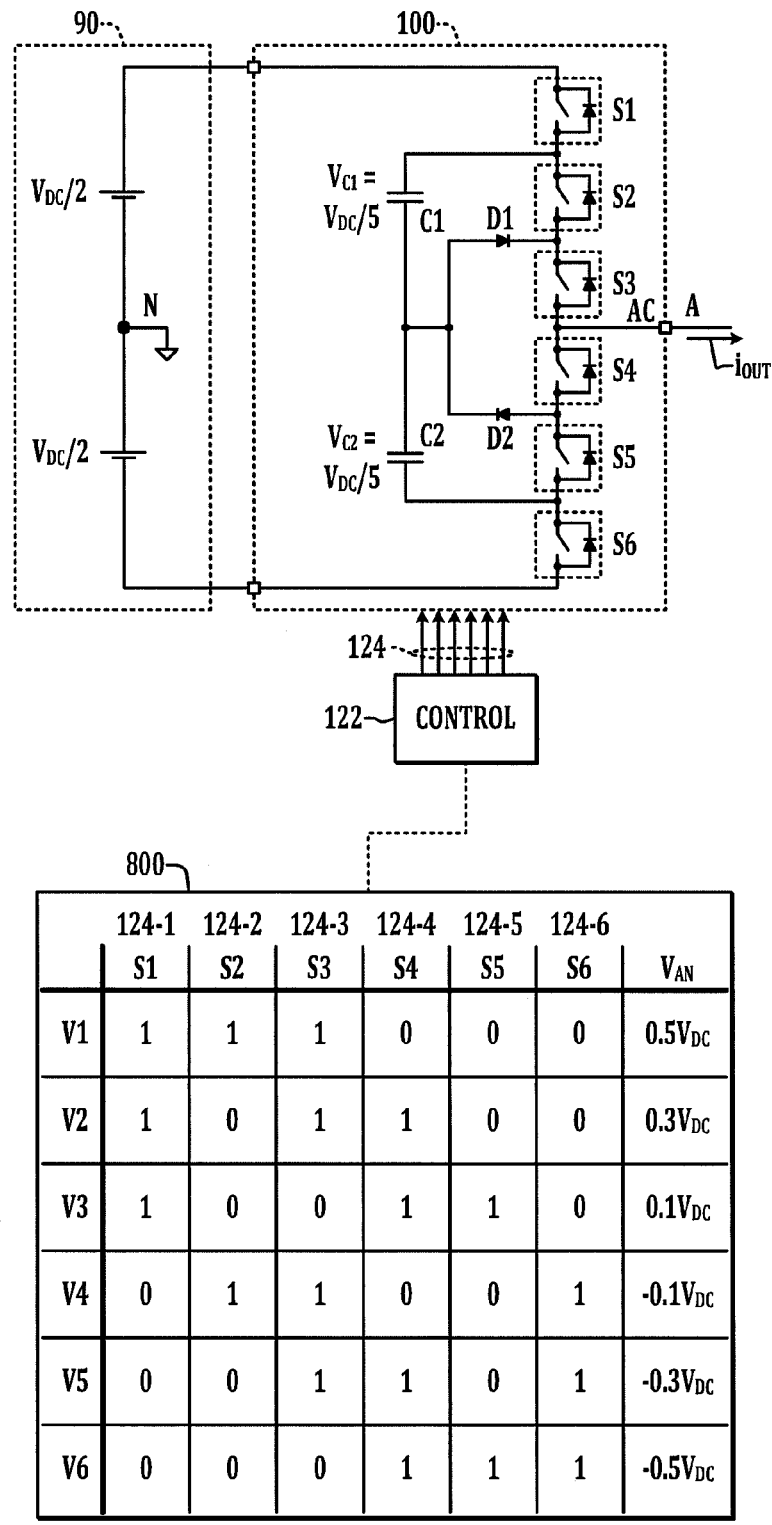
FIG. 27 is a partial schematic diagram illustrating another exemplary NNPC power converter and associated switching table in which the controller regulates the switched capacitor voltage to one fifth of the DC input voltage.

FIG. 26 illustrates another exemplary NNPC power converter implementation 100, in which the controller 122 provides the switching control signals 124 according to the illustrated switching state table 700 for operating the switches S1-S6 in order to provide multilevel output voltage at the inverter output node (AC) as well as to control charging and discharging of the switched capacitor C1 and C2. In this implementation, however, operation of the controller 122 regulates the capacitor voltages $V_{C1}$ and $V_{C2}$ to approximately one fourth of the DC bus voltage level ($V_{DC}/4$). Moreover, the output ($V_{AN}$) of the illustrated phase in FIG. 26 has equally spaced steps of $V_{DC}/4$.

Another possible implementation is shown in FIG. 27, in which the controller 122 operates according to the state table 800 to provide the switching control signals 124 to generate a multilevel voltage output at one of six different levels spaced by approximately one fifth of the DC input voltage (VDC/5), with the controller 122 operating to regulate the capacitor voltages at approximately one fifth of the DC input voltage level.

Figure 28:
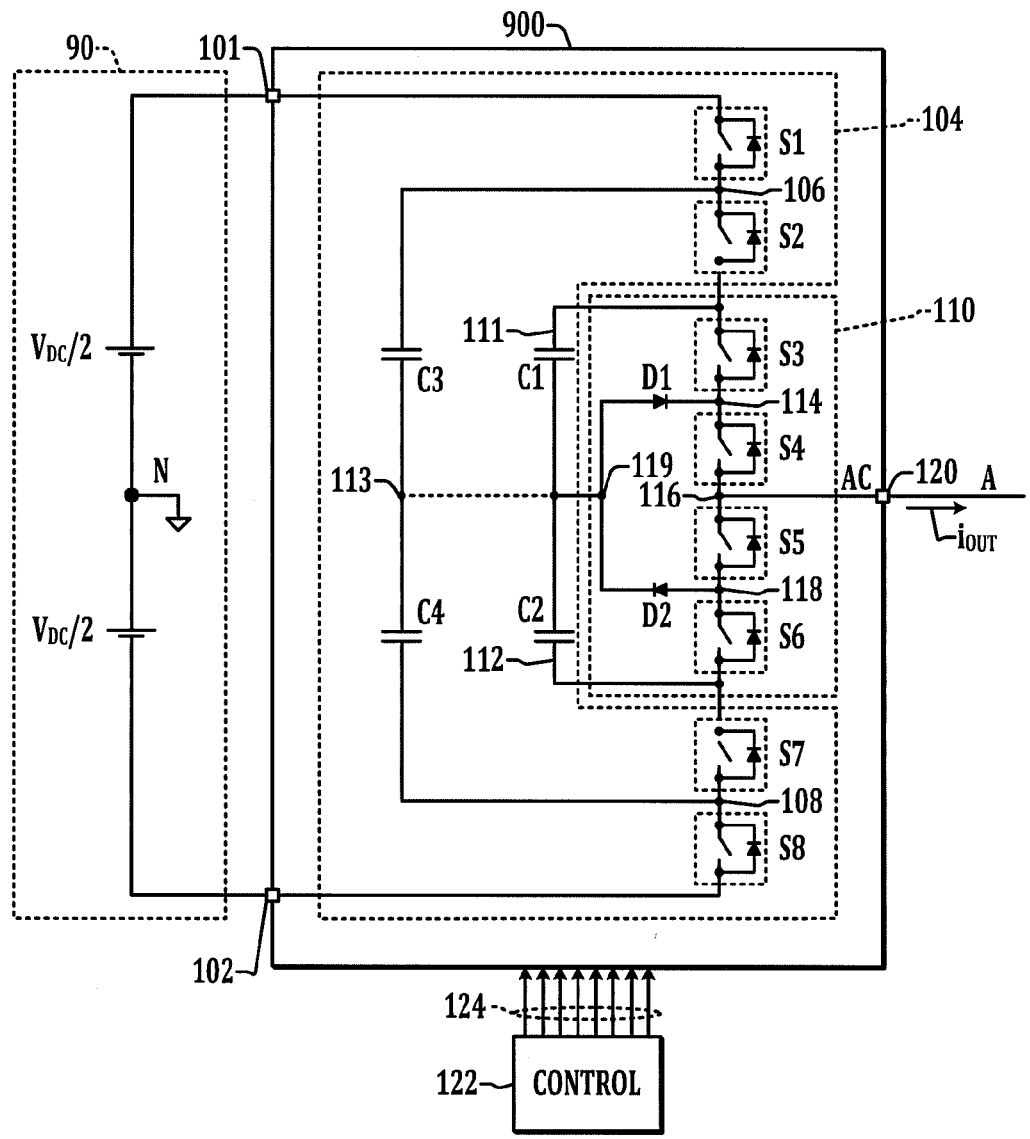
FIG. 28 is a schematic diagram illustrating another alternate NNPC power converter with multiple switched capacitor nesting stages in accordance with further aspects of the present disclosure.

FIG. 28 shows another NNPC power converter 900, in this case including multiple switched capacitor nesting stages configured around an NPC core circuit 110. This nested power converter 900 includes an inverter circuit 110, a switched capacitor circuit 104 and a controller 122. As in the above-described NNPC cell 100 of FIG. 1, the inverter circuit 110 in the converter 900 of FIG. 28 includes switching devices S3-S6 connected in series with one another between inverter circuit input nodes 111 and 112, along with an inverter output node 116 connecting S4 and S5. In addition, the inverter circuit 110 includes clamping switches or other clamping elements D1 and D2 connected in series with one another between first and second internal nodes 114 and 118 around switches S4 and S5 as shown. The clamping circuit also includes a third internal node 119 joining clamping elements D1 and D2. The clamping devices in the drawing are shown as diodes. However active switches such as IGBTs and IGCTs can also be used for clamping purposes. The converter 900 also includes a doubly nested switched capacitor circuit 104, in which a first switch S1 connected between the first DC input 101 and a fourth internal node 106, and a second switch S2 connected between node 106 and the first inverter input node 111. In addition, a third switch S7 is connected between the second inverter circuit input node 112 and a fifth internal node 108, and a fourth switch S8 is connected between the fifth internal node 108 and the second DC input 102.

Two levels of series-connected switched capacitors C1/C2 and C3/C4 are provided in FIG. 28, with C1 connected between the nodes 111 and 119 and C2 connected between nodes 119 and 112, as well as C3 connected between nodes 106 and a sixth internal node 113, and C4 connected between nodes 113 and 108. In certain implementations, the nodes 113 and 119 may be joined, although not required in all embodiments. The controller 122 provides switching control signals 124 to operate the inverter switches S3-S6 and the capacitor switching devices S1, S2, S7 and S8 to provide a multilevel output voltage at the inverter output node 116 as well as to control charging and discharging of the capacitors C1-C4, for example, using selection of redundant switching vectors as described above.

Figure 29:
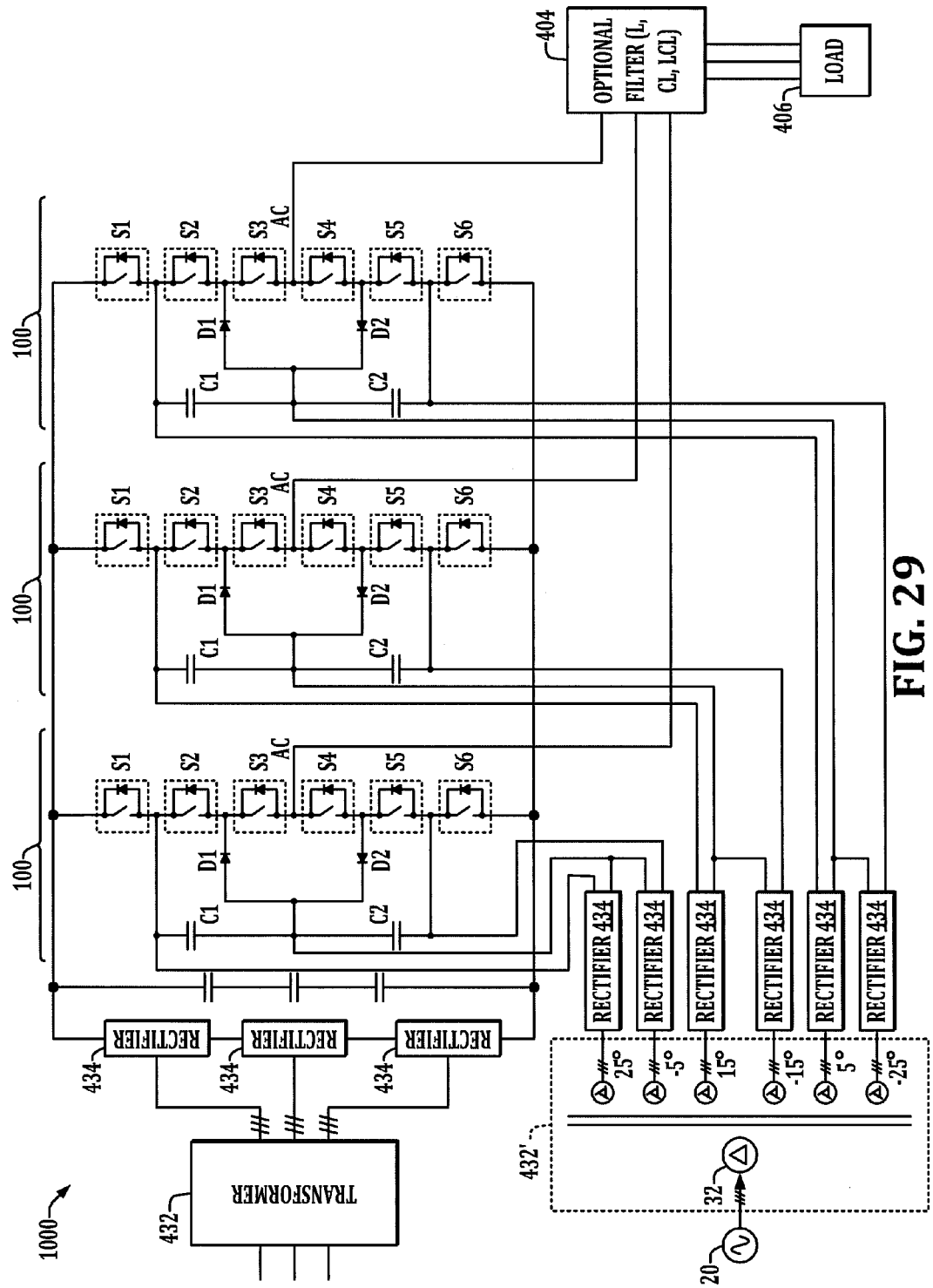
FIG. 29 is a schematic diagram illustrating another multi-phase power conversion system using three series-connected input rectifiers providing a DC bus to power NNPC converters for three output phases, with auxiliary windings of the main power transformer or a separate transformer for pre-charging and voltage balancing of the switched capacitors.

FIG. 29 illustrates another multiphase power conversion system 1000 which includes a transformer 432 and three series-connected input rectifiers 434 to generate a DC bus, with three NNPC stages 100 providing AC output voltage waveforms through an optional output filter 404 to drive a three-phase load 406, similar to the system 430 in FIG. 15 above (controller(s) 122 not separately shown in FIG. 29). In addition, the system 1000 of FIG. 29 includes an auxiliary transformer 432' (or an auxiliary secondary winding of the main transformer 432) providing AC inputs to six additional rectifiers 434, with the resulting DC output of each of the rectifiers 434 being connected across a corresponding one of the switched capacitors C1, C2 of the NNPC stages 100. In operation, the auxiliary transformer or secondary 432' is selectively energized in order to precharge the switched capacitors C1 and C2 of each of the stages 100 via the intervening rectifiers 434, such as at power up of the overall system 1000, and thereafter may be deenergized once the system 1000 reaches steady state operation.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A multilevel power converter, comprising:
an inverter circuit, comprising:
an inverter switching circuit including: a plurality of inverter switching devices connected in series with one another between first and second inverter circuit input nodes, and an inverter output node connecting two of the plurality of inverter switching devices, and
a clamping circuit including first and second clamping elements connected in series with one another between first and second internal nodes of the inverter switching circuit, and a third internal node joining the first and second clamping elements;
a switched capacitor circuit, comprising:
switched capacitor circuit switching devices individually connected between a corresponding DC input and a corresponding inverter circuit input node, and
first and second capacitors individually connected between a corresponding one of the inverter circuit input nodes and the third internal node; and
a controller providing switching control signals to the plurality of inverter switching devices and to the switched capacitor circuit switching devices to provide a multilevel output voltage at the inverter output node at one of a plurality of distinct levels;
wherein the controller selects from among a plurality of redundant switching states for at least one of the distinct output voltage levels in providing the switching control signals to control charging and discharging of the first and second capacitors to regulate corresponding first and second capacitor voltages to one third of a DC input voltage between the first and second DC inputs.

2. The multilevel power converter of claim 1:
wherein the inverter switching circuit comprises:
a first inverter switching device with a first terminal connected to the first inverter circuit input node and a second terminal connected to the first internal node,
a second inverter switching device with a first terminal connected to the first internal node and a second terminal connected to the inverter output node,
a third inverter switching device with a first terminal connected to the inverter output node and a second terminal connected to the second internal node, and
a fourth inverter switching device with a first terminal connected to the second internal node and a second terminal connected to the second inverter circuit input node;
wherein the first clamping element includes a first terminal connected to the third internal node, and a second terminal connected to the first internal node;
wherein the second clamping element includes a first terminal connected to the second internal node and a second terminal connected to the third internal node;
wherein the switched capacitor circuit, comprises:
a first switched capacitor circuit switching device with a first terminal connected to a first DC input, and a second terminal connected to the first inverter circuit input node, and
a second switched capacitor circuit switching device with a first terminal connected to the second inverter circuit input node, and a second terminal connected to a second DC input;

wherein the first capacitor includes a first terminal connected to the first inverter circuit input node and a second terminal connected to the third internal node; and wherein the second capacitor includes a first terminal connected to the third internal node and a second terminal connected to the second inverter circuit input node.

3. The multilevel power converter of claim 2, wherein the controller provides the switching control signals to the inverter switching devices and to the switched capacitor circuit switching devices to provide the output voltage at one of four distinct levels.

4. The multilevel power converter of claim 3, wherein the controller selects from among a plurality of redundant switching states for at least one of the four distinct output voltage levels in providing the switching control signals to control charging and discharging of the first and second capacitors.

5. The multilevel power converter of claim 1, wherein the controller provides the switching control signals to the inverter switching devices and to the switched capacitor circuit switching devices to provide the output voltage at one of four distinct levels.

6. The multilevel power converter of claim 5, wherein the controller selects from among a plurality of redundant switching states for at least one of the four distinct output voltage levels in providing the switching control signals to control charging and discharging of the first and second capacitors.

7. The multilevel power converter of claim 5, wherein the controller provides the switching control signals to the inverter switching devices and to the switched capacitor circuit switching devices to provide the output voltage at one of four distinct levels of substantially equally spaced steps.

8. The multilevel power converter of claim 1, wherein the controller provides the switching control signals to the inverter switching devices and to the switched capacitor circuit switching devices to provide the output voltage at one of a plurality of distinct levels of substantially equally spaced steps.

9. The multilevel power converter of claim 1:
wherein the switched capacitor circuit comprises:
a first switched capacitor circuit switching device with a first terminal connected to a first DC input, and a second terminal connected to a fourth internal node,
a second switched capacitor circuit switching device with a first terminal connected to the fourth internal node, and a second terminal connected to the first inverter circuit input node,
a third switched capacitor circuit switching device with a first terminal connected to the second inverter circuit input node, and a second terminal connected to a fifth internal node,
a fourth switched capacitor circuit switching device with a first terminal connected to the fifth internal node, and a second terminal connected to a second DC input,
a first capacitor including a first terminal connected to the first inverter circuit input node, and a second terminal connected to the third internal node,
a second capacitor including a first terminal connected to the third internal node, and a second terminal connected to the second inverter circuit input node,
a third capacitor including a first terminal connected to the fourth internal node, and a second terminal connected to a sixth internal node, and
a fourth capacitor including a first terminal connected to the sixth internal node, and a second terminal connected to the fifth internal node.

10. The multilevel power converter of claim 1, wherein the third internal node has no fixed or controlled connection to a neutral node associate with the DC inputs.

11. A multilevel power converter, comprising:
an inverter circuit, comprising:
an inverter switching circuit including: a plurality of inverter switching devices connected in series with one another between first and second inverter circuit input nodes, and an inverter output node connecting two of the plurality of inverter switching devices, and
a clamping circuit including first and second clamping elements connected in series with one another between first and second internal nodes of the inverter switching circuit, and a third internal node joining the first and second clamping elements;
a switched capacitor circuit, comprising:
switched capacitor circuit switching devices individually connected between a corresponding DC input and a corresponding inverter circuit input node, and
first and second capacitors individually connected between a corresponding one of the inverter circuit input nodes and the third internal node; and
a controller providing switching control signals to the plurality of inverter switching devices and to the switched capacitor circuit switching devices to provide a multilevel output voltage at the inverter output node at one of a plurality of distinct levels;
wherein the controller selects from among a plurality of redundant switching states for at least one of the distinct output voltage levels in providing the switching control signals to control charging and discharging of the first and second capacitors to regulate corresponding first and second capacitor voltages to one fifth of a DC input voltage between the DC inputs.

12. The multilevel power converter of claim 11, wherein the controller provides the switching control signals to the inverter switching devices and to the switched capacitor circuit switching devices to provide the output voltage at one of six distinct levels.

13. The multilevel power converter of claim 12, wherein the controller selects from among a plurality of redundant switching states for at least one of the six distinct output voltage levels in providing the switching control signals to control charging and discharging of the first and second capacitors.

14. The multilevel power converter of, claim 11, wherein the third internal node has no fixed or controlled connection to a neutral node associate with the DC inputs.

15. A power conversion system, comprising a plurality of multilevel power converters, the individual multilevel power converters comprising:
an inverter circuit, comprising:
an inverter switching circuit including: a plurality of inverter switching devices connected in series with one another between first and second inverter circuit input nodes, and an inverter output node connecting two of the plurality of inverter switching devices, and
a clamping circuit including first and second clamping elements connected in series with one another between first and second internal nodes of the inverter switching circuit, and a third internal node joining the first and second clamping elements;
a switched capacitor circuit, comprising:
switched capacitor circuit switching devices individually connected between a corresponding DC input and a corresponding inverter circuit input node, and first and second capacitors individually connected between a corresponding one of the inverter circuit input nodes and the third internal node; and a controller providing switching control signals to the plurality of inverter switching devices and to the switched capacitor circuit switching devices to provide a multilevel output voltage at the inverter output node at one of a plurality of distinct levels;

wherein the controller selects from among a plurality of redundant switching states for at least one of the distinct output voltage levels in providing the switching control signals to control charging and discharging of the first and second capacitors to regulate corresponding first and second capacitor voltages to one third of a DC input voltage between the first and second DC inputs.

16. The power conversion system of claim 15, comprising:
a first multilevel power converter; and
a second multilevel power converter;
wherein the DC inputs of the first and second multilevel power converters are connected together;
wherein the inverter output node of the first multilevel power converter is connected to a system neutral node; and
wherein the inverter output node of the second multilevel power converter provides an AC output for the power conversion system.

17. The power conversion system of claim 15, wherein the controller provides the switching control signals to the inverter switching devices and to the switched capacitor circuit switching devices to provide the output voltage of each multilevel power converter at one of at least four distinct levels.

18. The power conversion system of claim 17, wherein the controller selects from among a plurality of redundant switching states for at least one of the four distinct output voltage levels in providing the switching control signals to control charging and discharging of the first and second capacitors.

19. The power conversion system of claim 15, wherein at least one of the multilevel power converters provides an output voltage for each of a plurality of output phases of the power conversion system.

20. The power conversion system of claim 15, wherein the third internal node has no fixed or controlled connection to a neutral node associate with the DC inputs.

21. A multilevel power converter, comprising:
an inverter circuit, comprising:
an inverter switching circuit including: a plurality of inverter switching devices connected in series with one another between first and second inverter circuit input nodes, and an inverter output node connecting two of the plurality of inverter switching devices, and
a clamping circuit including first and second clamping elements connected in series with one another between first and second internal nodes of the inverter switching circuit, and a third internal node joining the first and second clamping elements, wherein the third internal node has no fixed or controlled connection to a neutral node associate with the DC inputs;
a switched capacitor circuit, comprising:
switched capacitor circuit switching devices individually connected between a corresponding DC input and a corresponding inverter circuit input node, and
first and second capacitors individually connected between a corresponding one of the inverter circuit input nodes and the third internal node; and
a controller providing switching control signals to the plurality of inverter switching devices and to the switched capacitor circuit switching devices to provide a multilevel output voltage at the inverter output node and to control charging and discharging of the first and second capacitors.

22. The multilevel power converter of claim 21, wherein the controller provides the switching control signals to the inverter switching devices and to the switched capacitor circuit switching devices to provide the output voltage at one of four distinct levels.

23. The multilevel power converter of claim 22, wherein the controller selects from among a plurality of redundant switching states for at least one of the four distinct output voltage levels in providing the switching control signals to control charging and discharging of the first and second capacitors to regulate corresponding first and second capacitor voltages to less than half of a DC input voltage between the first and second DC inputs.

* * * * *